United States Patent [19]

Mitchell et al.

[11] 3,980,835

[45] Sept. 14, 1976

[54] DIGITAL NETWORK SYNCHRONIZING SYSTEM

[75] Inventors: Paul Anthony Mitchell, Stowmarket; William Bunn, Ipsurich, both of England

[73] Assignee: The Post Office, London, England

[22] Filed: May 27, 1975

[21] Appl. No.: 580,942

[30] Foreign Application Priority Data

May 29, 1974 United Kingdom .............. 23714/74

[52] U.S. Cl. ........................ 179/15 BS; 179/15 AF

[51] Int. Cl.[2] ........................................ H04J 3/06

[58] Field of Search .................... 179/15 BS, 15 AF; 178/62.5 R

[56] References Cited

UNITED STATES PATENTS

| | | | |
|---|---|---|---|
| 3,453,594 | 7/1969 | Jarvis | 179/15 BS |
| 3,479,462 | 11/1969 | Tamato | 179/15 BS |
| 3,504,125 | 3/1970 | Inose | 179/15 BS |
| 3,622,993 | 11/1971 | Overdoth | 179/15 BS |
| 3,869,579 | 3/1975 | Karl | 179/15 BS |

*Primary Examiner*—David L. Stewart
*Attorney, Agent, or Firm*—Hall & Houghton

[57] ABSTRACT

In a pulse code modulation communication system in which in each station the local oscillator frequency is controlled by the difference between the aligner fills at the ends of each link coupled to the particular station, a balanced modifier can be applied periodically to the aligner fills at the ends of a link to make the fills symmetrically disposed about a mid range value and/or a straight modifier can be applied periodically to an aligner fill in the particular station to make the aligner fill equal to the mid range value, the modifiers preventing the establishment of falsely synchronized modes among the oscillators of the system.

13 Claims, 22 Drawing Figures

DATA TO SWITCHING OR DATA PROCESSING
CLOCK OUTPUT
CLOCK
COMMON CONTROL MODULE
FROM OTHER LINKS
FILL COUNTER
LOCAL FILL
TO LINK FOR TRANSMISSION TO OTHER END
COMMUNICATION ALIGNER
EXTRACT FRAMING & SYNCH. SIGNALS
MODIFIER UNIT
FILL DIFFERENCE
CONTROL COMPARATOR
REMOTE FILL
EXTRACT FILL, OL, A&R SIGNALS
INCOMING FROM LINK
OL
A
R
1
2
3
4
5
6
7
8
9
10
11
12
13
14
15

A
B
C
D
E
a
b
c
d
e
f
g

513 TO PROGRAMME DELAY (AVERAGER FIG.6)
L.S.D.
512
FULL ADDERS
Cin
Co
528
511
$\overline{4}$ (SEQ.GEN. FIG.3)
529
510
$\overline{1}$
$\overline{3}$ (SEQ.GEN.)
BALANCED MODIFIER
STORES 508
STRAIGHT MODIFIER
STORES 509
531 BUFFER
2FS (W.F.G.)
S.M. UPDATED (LINK O/P FIG.4)
533
532
ENABLE S.M. STORE CLOCK (SEQ.GEN. FIG.3)
507
TRUE COMPLEMENT GATES
BUFFER 530
$\overline{Q}$
506
STORES 506
2F SUM ÷ 2 STORES
INVERTED
$\overline{2}$ (SEQ. GEN. FIG.3)

DIGITAL NETWORK SYNCHRONIZING SYSTEM

This invention relates to a digital network synchronising system and is particularly, but not exclusively, suited for use in synchronising the switching centres of a pulse code modulation (PCM) communication system.

In a PCM communication system it is usual to provide a separate oscillator at each switching centre for the purposes of controlling the switching and data processing operations at that centre. In order to ensure the correct interpretation of digital information transmitted from one centre to another, it is essential that the oscillators of the different centres are synchronised with one another, and various proposals have been made for achieving this synchronisation. Because the delays imposed by a link coupling two centres can vary quite rapidly, it is also usual to include in the input to each switching centre from each link connected to it an aligner into which the digits from the particular link are fed as they arrive and from which they are read into the switching centre under the control of the clock oscillator of that centre. A convenient way of controlling the oscillator frequency is to use the number of digits stored in the aligner to control the oscillator frequency so that the aligner is neither full nor empty. However, various difficulties arise with such a simple system, particularly when several links are connected to one or more of the switching centres because the changes in the oscillator frequency required by one link may conflict with those required by another. It is, moreover, possible for an oscillator to be locked at a considerably different phase from the other oscillators in the system when using a synchronising technique of this kind. In addition, the oscillators are called upon to change frequency not only in response to variation in the frequency of other oscillators but also with change in the propagation delays imposed by the links.

The number of digits stored in an aligner is termed its "fill" and it has been proposed to reduce the amount of variation required of the oscillator frequency by making its control dependent upon the difference between the fills of the aligners at both ends of a link. In this way the aligners accommodate the changes in the propagation delay imposed by the link and the oscillators at the ends of the link are synchronised to one another. However, this system raises the problem that in time the aligners may reach a full or empty condition and no means is provided for controlling the oscillator frequency to keep the aligner fills within a normal working range.

A second problem arises when the propagation delay (or any change therein) is not the same in both directions of transmission, which can cause an unnecessary control to be applied to its oscillator, and can result in conflicting controls being applied to an oscillator.

It is an object of the present invention to overcome both of these difficulties.

According to one aspect of the present invention there is provided a digital communication system having at least two stations connected by at least one link, in which each station has a local clock oscillator for timing operations in the particular station, a communication aligner for each link by which signal digits can be incoming to the particular station, the incoming digits being stored in the communication aligner as they arrive at the station and being read therefrom in response to signals from the local clock oscillator, and for each link, a fill counter for recording a total dependent on the number of digits stored in the corresponding communication aligner in the particular station; wherein in the particular station there are further provided means for comparing a representation of this total with a representation of the total recorded in the fill counter at the remote end of the link, means dependent upon the difference between the representations being compared to adjust the frequency of the local clock oscillator so as to tend to reduce the difference and further means for periodically modifying the total in the fill counter in the particular station so that it lies within a predetermined range.

In order to make the synchronisation system independent of the means of realising the communication aligner (both in technology and capacity) and in order to permit the easier manipulation of aligner fills so as to overcome the aforesaid problems, a fill counter is used to measure the phase difference in fractions of a digit between the incoming digits and the locally generated digits. The count produced is the complement of the number of digits that would be stored in a hypothetical aligner with the same capacity as the fill counter. For example, if the fill counter has a range of 256 digits the count produced equals 256 minus the number of digits that would be stored in a hypothetical frame aligner. Reference hereunder to an aligner refers to a hypothetical aligner which may, but does not have to, correspond to the communication aligner.

Preferably the incoming digits are subdivided into frames and the capacity of an aligner (i.e. range of fill counter) may be set to one or two frames. If the clocks in the stations at both ends of a link are in phase, the number of digits stored in the aligners, termed the aligner fills, may be modified so that both aligners are half full; in the realisation described below both the fill counters register counts of one half frame. The difference between the aligner fills is zero, being twice the phase error between the clocks.

According to the terminology used herein the number of digits stored in an aligner without modification is termed the aligner "count," the amount by which the number is altered is termed the "modifier" and the resulting number of digits after modification is termed the aligner fill. Preferably the fill just after modification lies in the middle of the predetermined range.

In time the propagation delays of the links will change and consequently considerable phase shifts of the received digits may occur. For the aligner fill to be kept within the predetermined range it must therefore be updated periodically. There are two ways in which the updating can be carried out, either at regular intervals of a few seconds, say, or whenever a line fail is detected on the particular link. The first of these ways is preferable because if a link is exceptionally reliable the modifiers could become significantly out of date as a result of temperature variation.

According to a second aspect of the present invention there is provided a station for a digital communication system including a local clock oscillator and for each link connected to the station an aligner in which digits incoming by the particular link are stored as they arrive at the station, the digits being read from the aligner in response to signals from the local clock oscillator, a fill counter recording a total dependent on the number of digits stored in the aligner, means for transmitting by the link a first indication of the total in the fill counter, means for deriving from the link a second indication of the total in a fill counter located at the remote end of the link, means for comparing the first and second indications to produce a difference signal, means responsive to the difference signal to control the frequency of the local clock oscillator, and means for periodically modifying the total in the fill counter so that it lies within a predetermined range.

In order that the invention may be fully understood and readily carried into effect, it will now be described with reference to the accompanying drawings, of which:

FIGS. 9a-g show in detail a fill decoder of an embodiment of the invention; and

Figure 8:
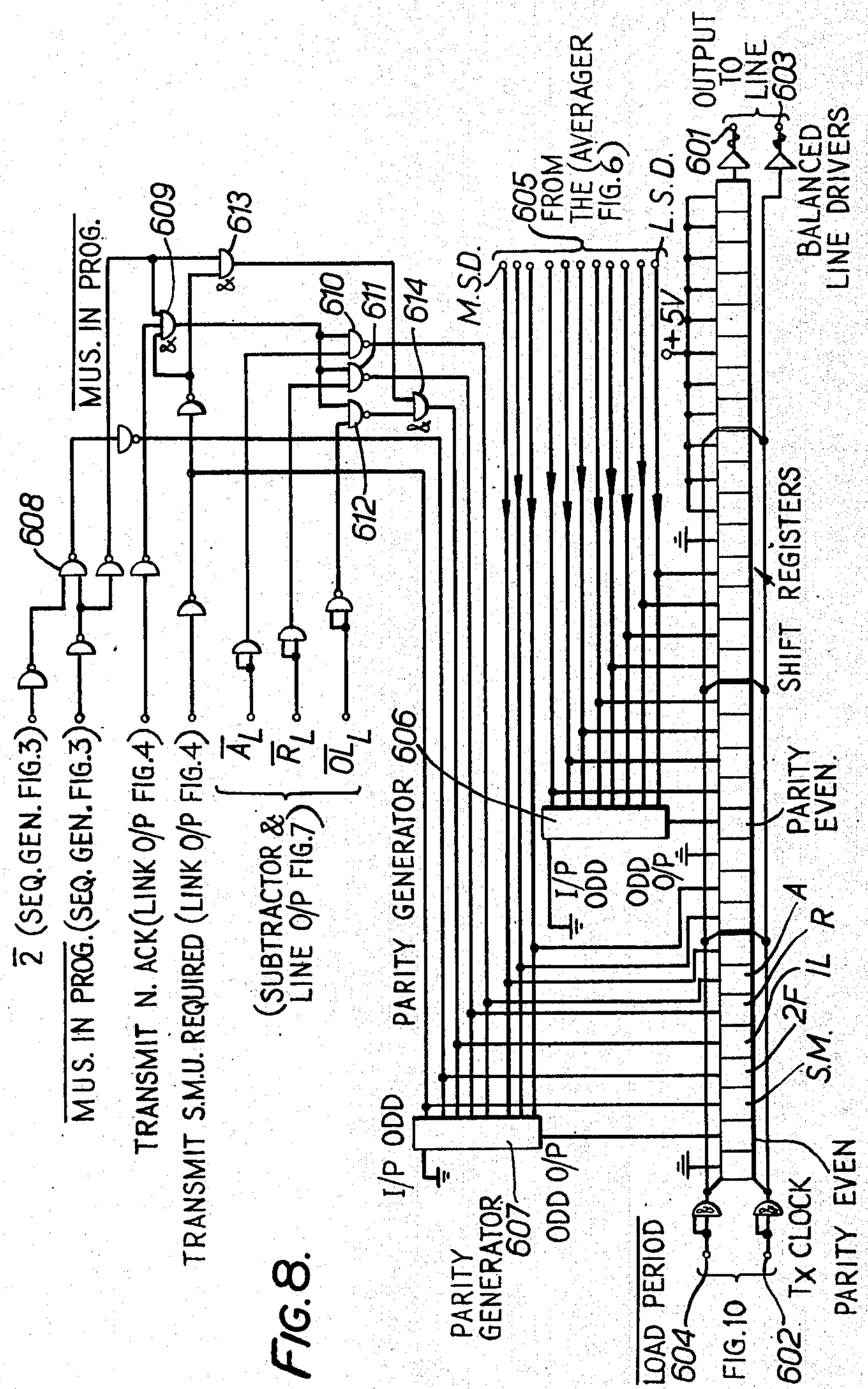
FIG. 8 shows in detail a transmit signal module of an embodiment of the invention.
Figure 9:
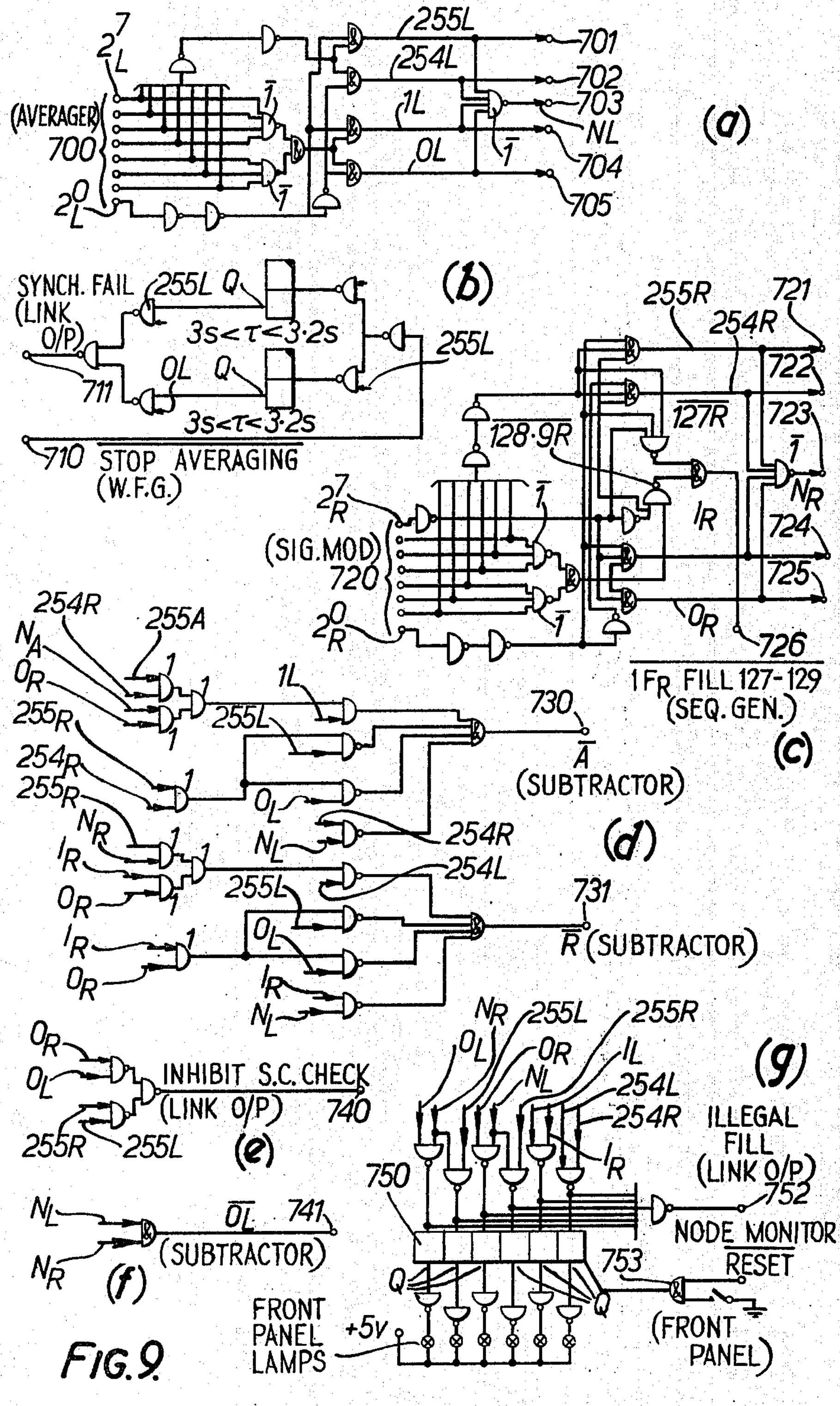
Figure 10:
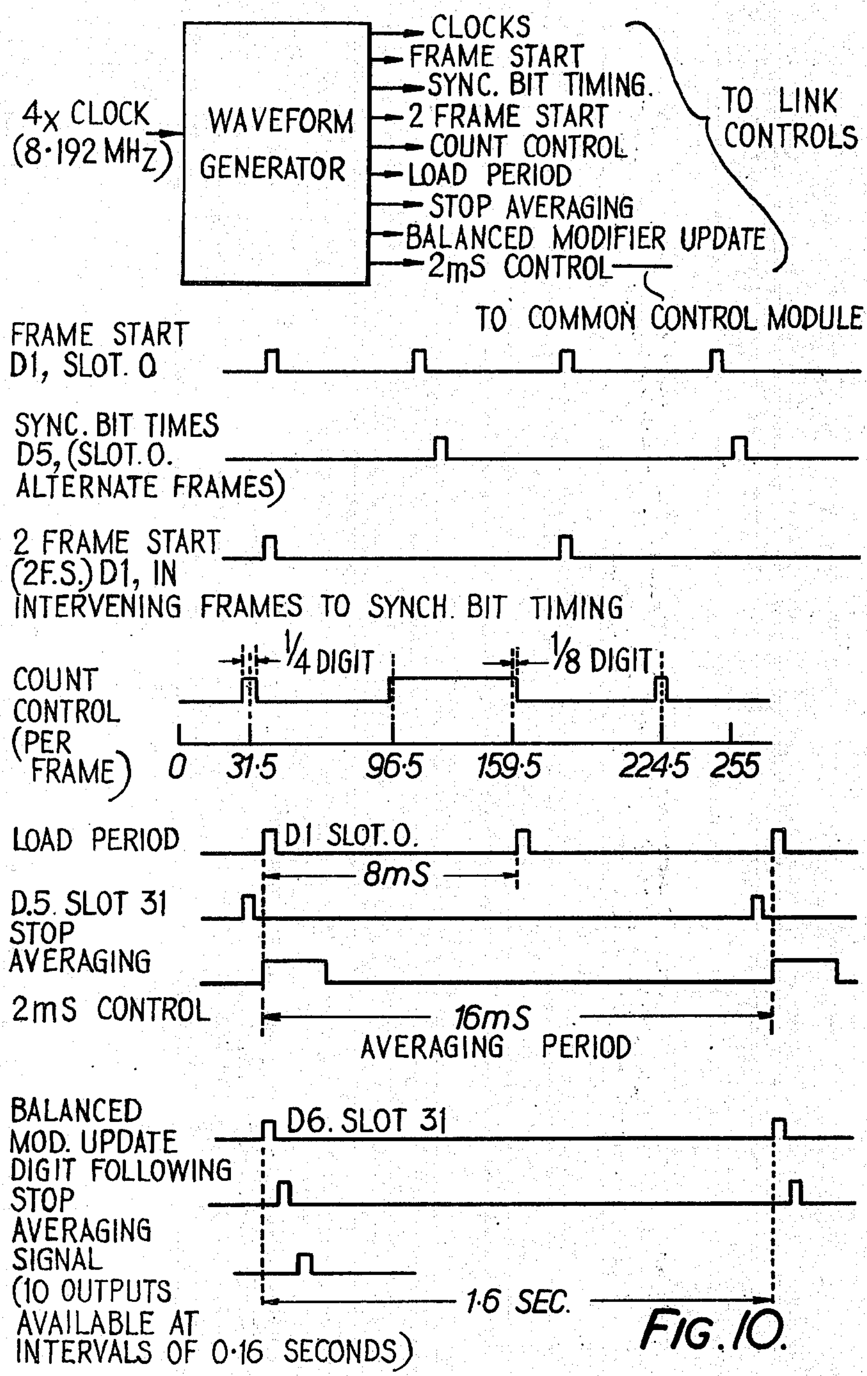

FIG. 10 shows the wave forms produced by a wave form generator which are used in FIGS. 3 to 9.

Figures 1, 2:
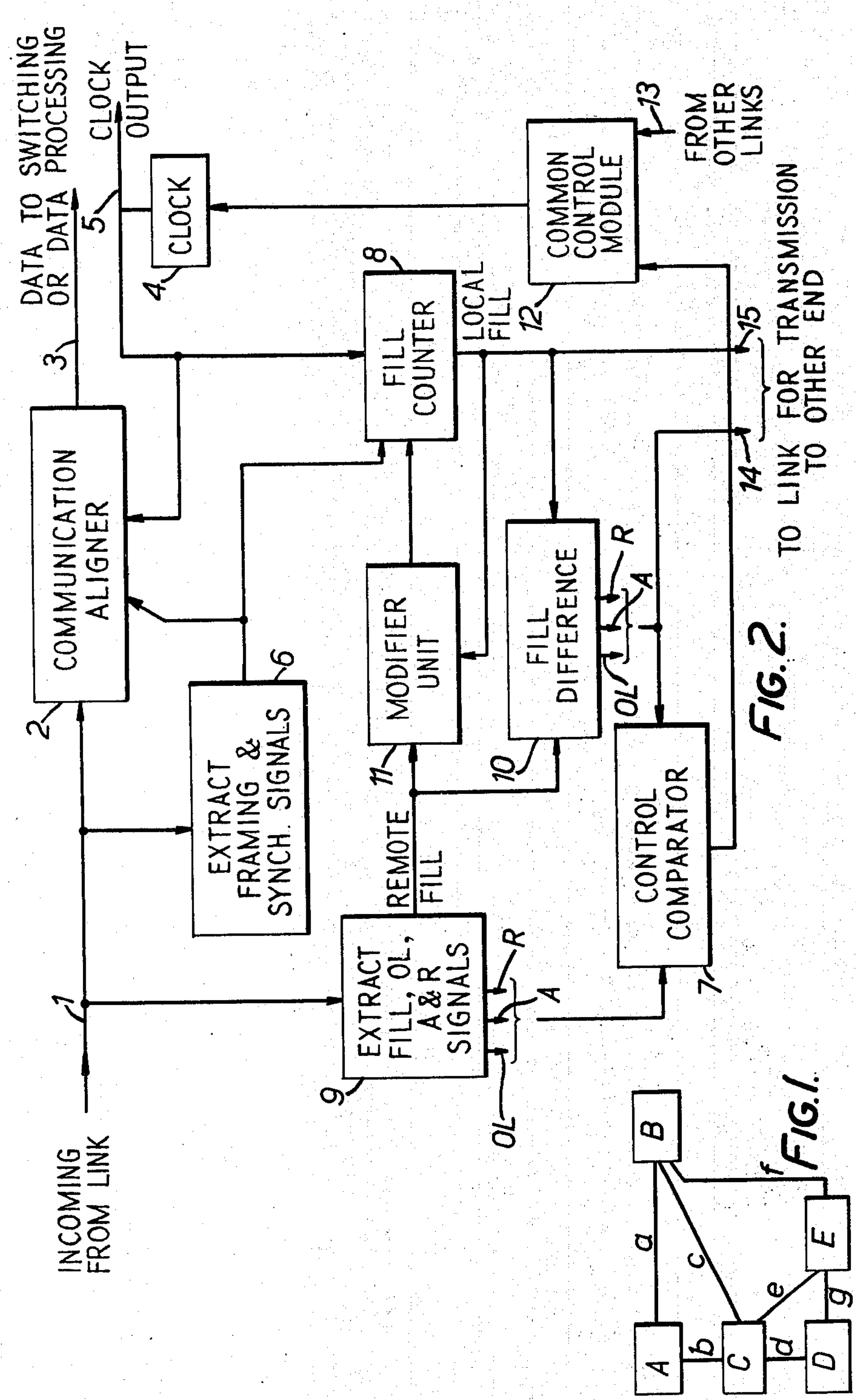
FIG. 1 is a block diagram of an example of a digital communication system of the kind to which the invention could be applied.
FIG. 2 is a block diagram of a synchronising unit for the end of each link connected to a switching centre according to an example of the invention.
Figure 3A:
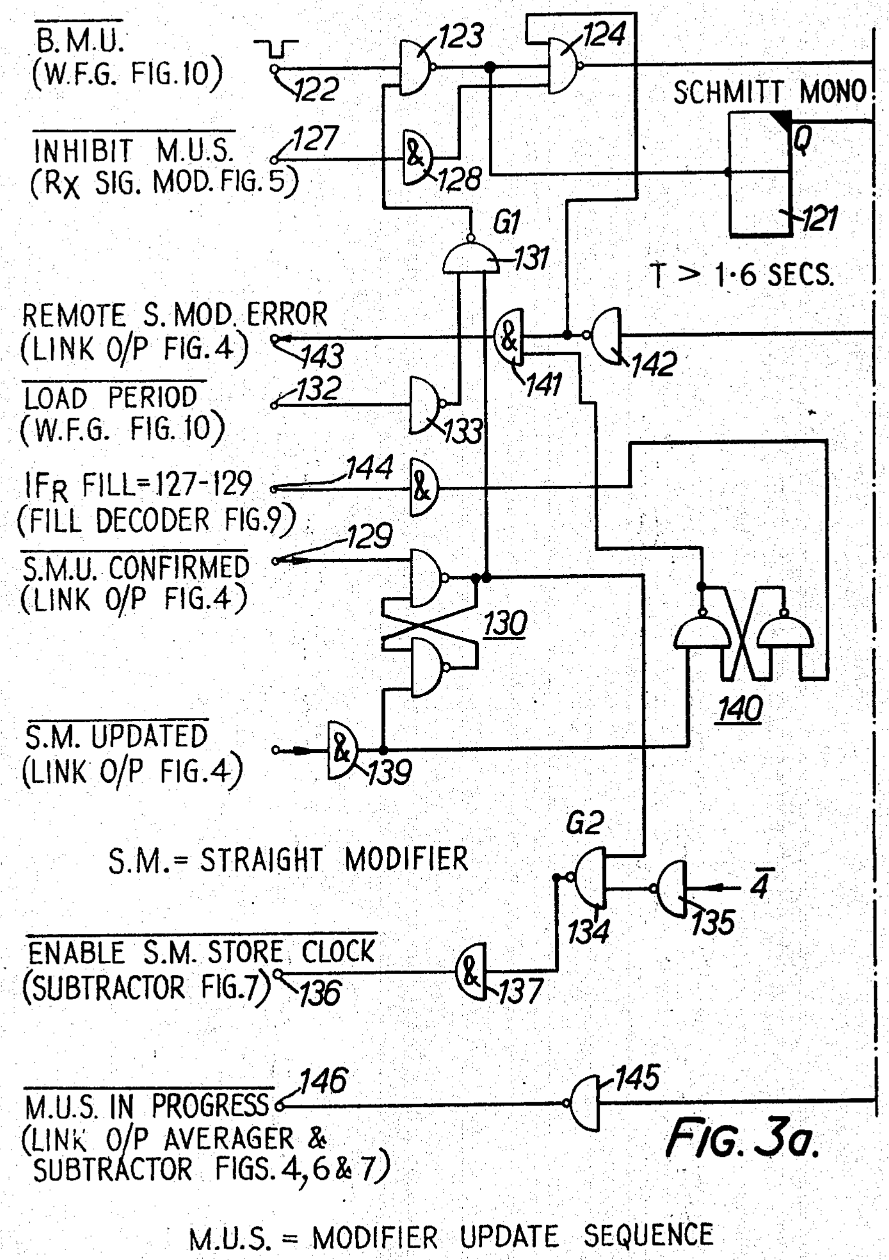
FIGS. 3a and 3b show in detail a sequence generator of an embodiment of the invention.
Figure 3B:
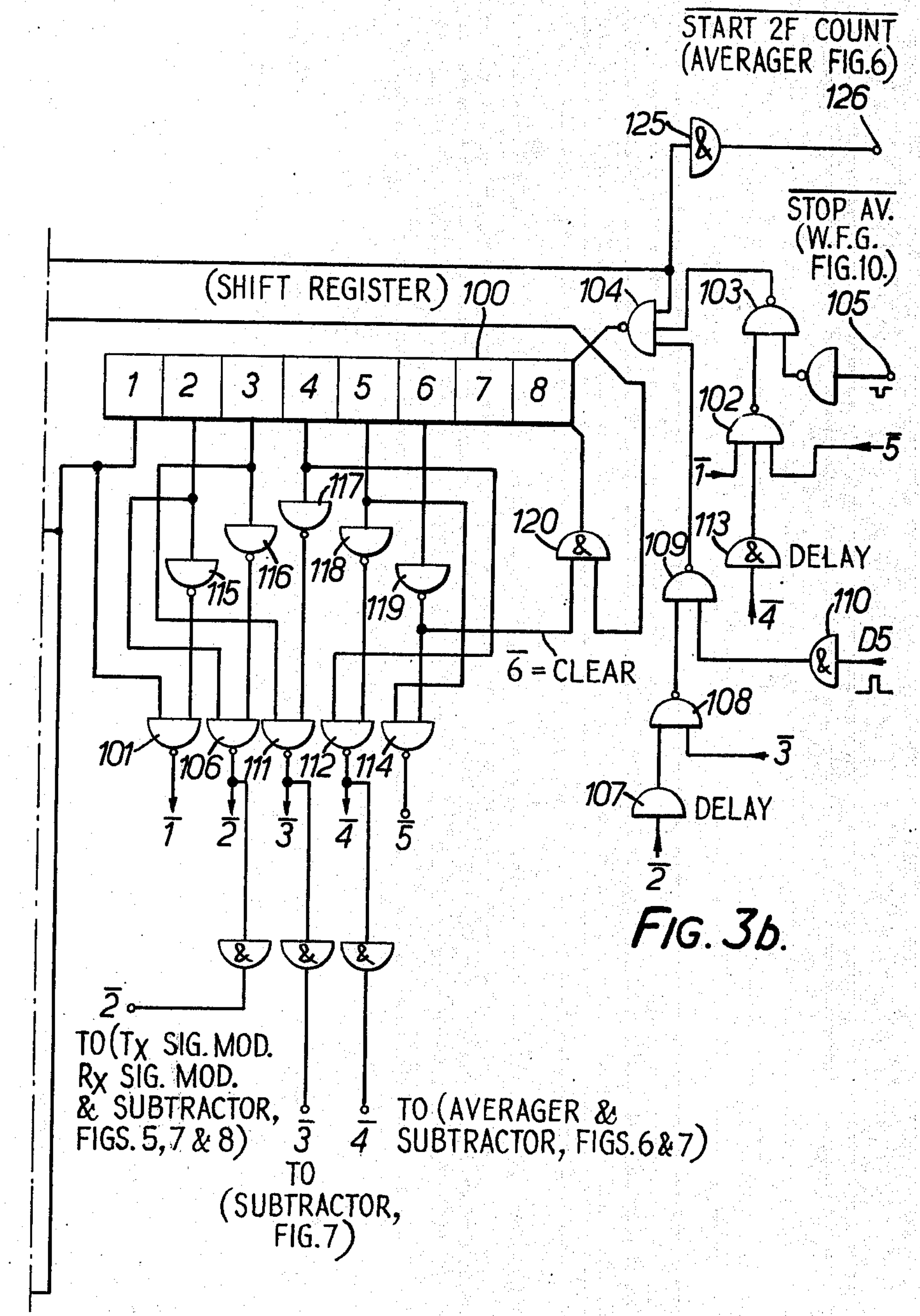
Figure 4A:
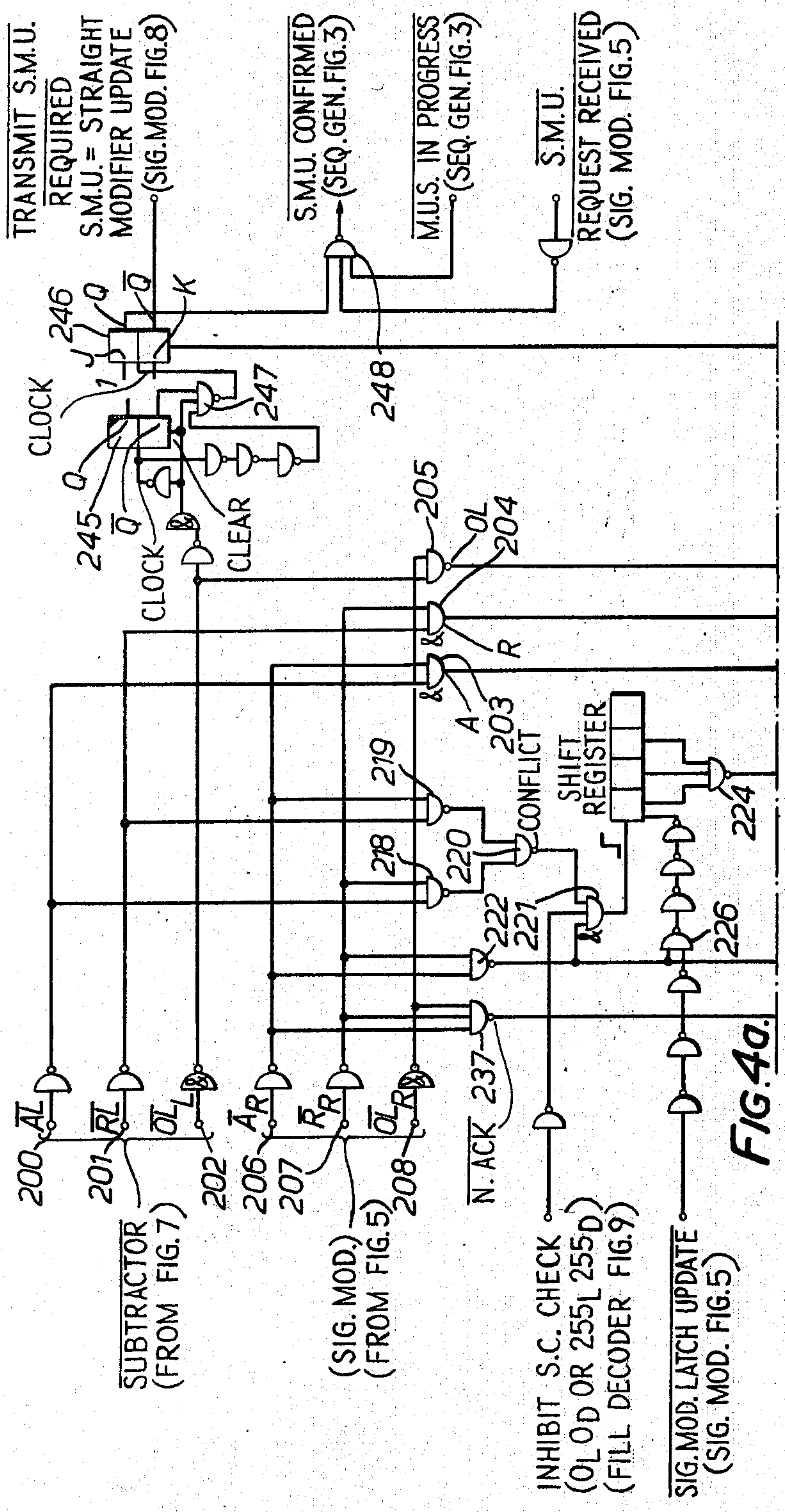
FIGS. 4a and 4b show in detail a link output unit of an embodiment of the invention.
Figure 4B:
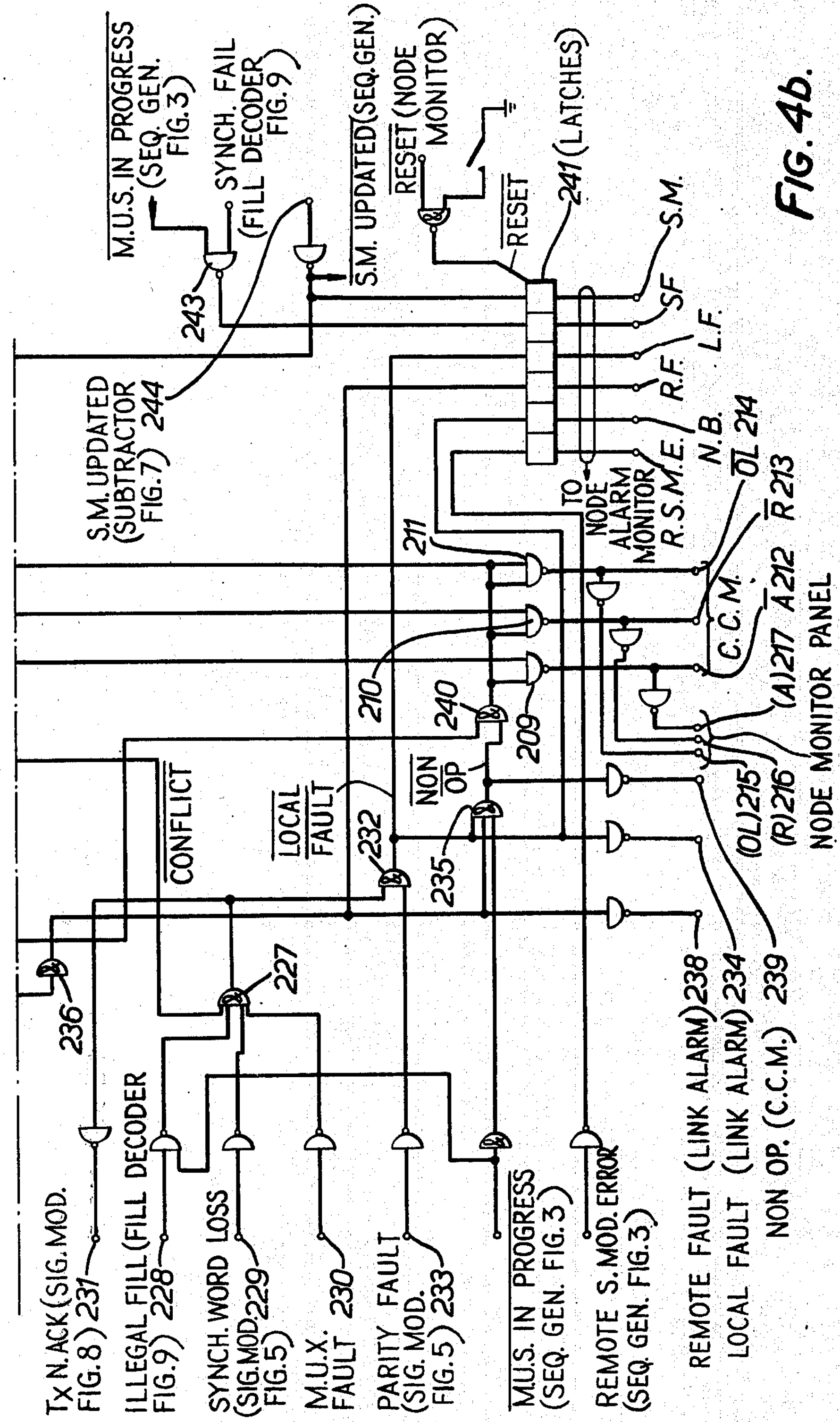
Figure 5A:
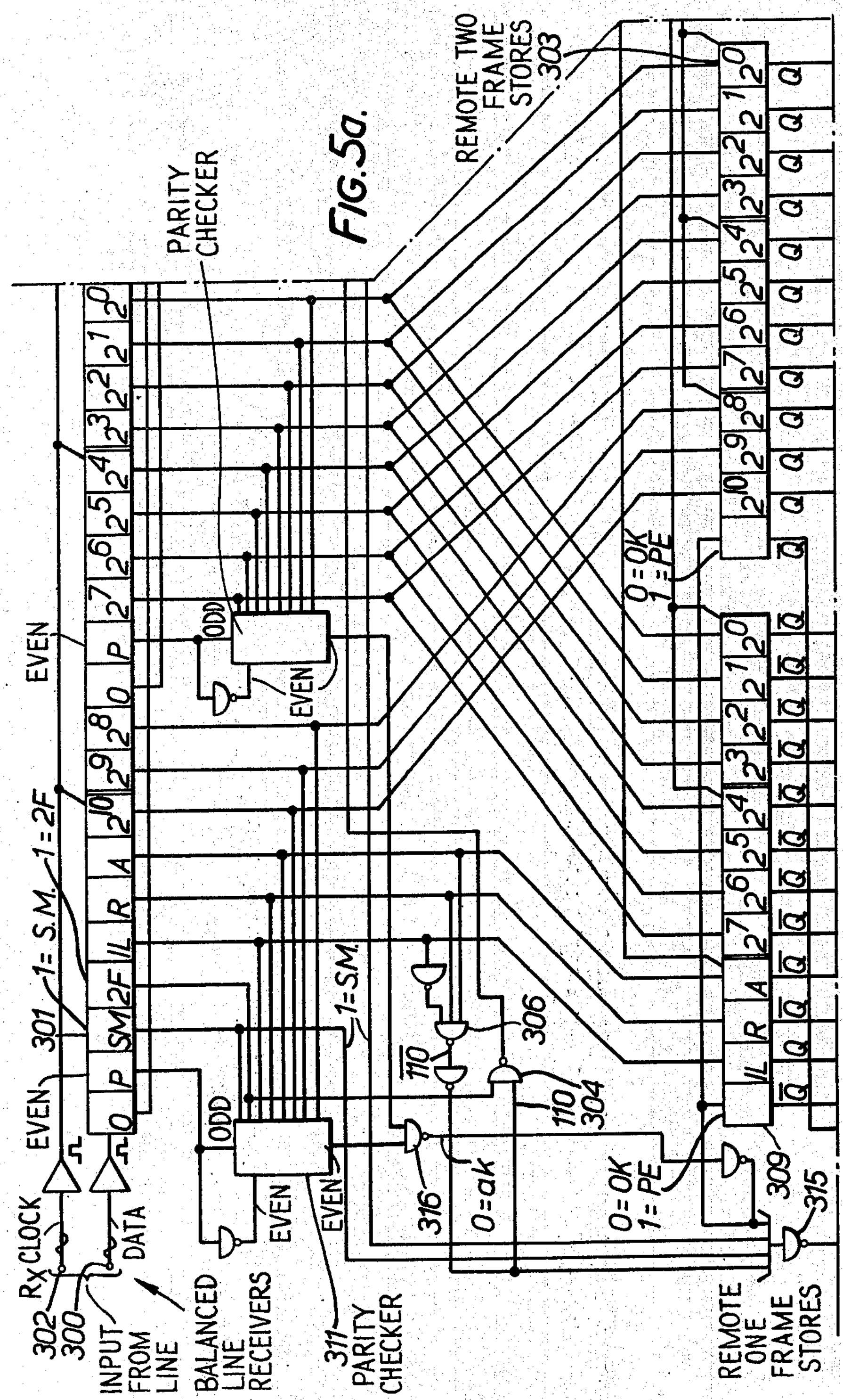
FIGS. 5a-5c show in detail a receive signal module of an embodiment of the invention.
Figure 5B:
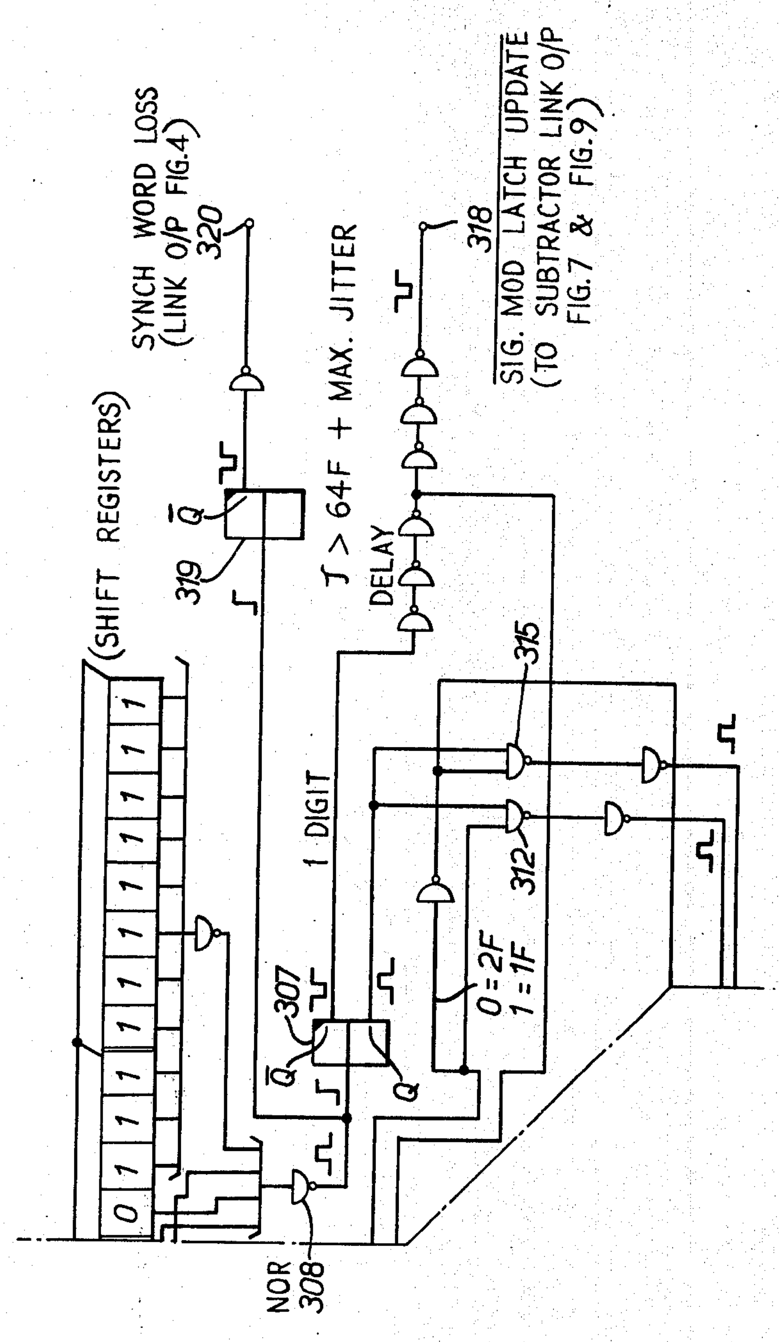
Figure 5C:
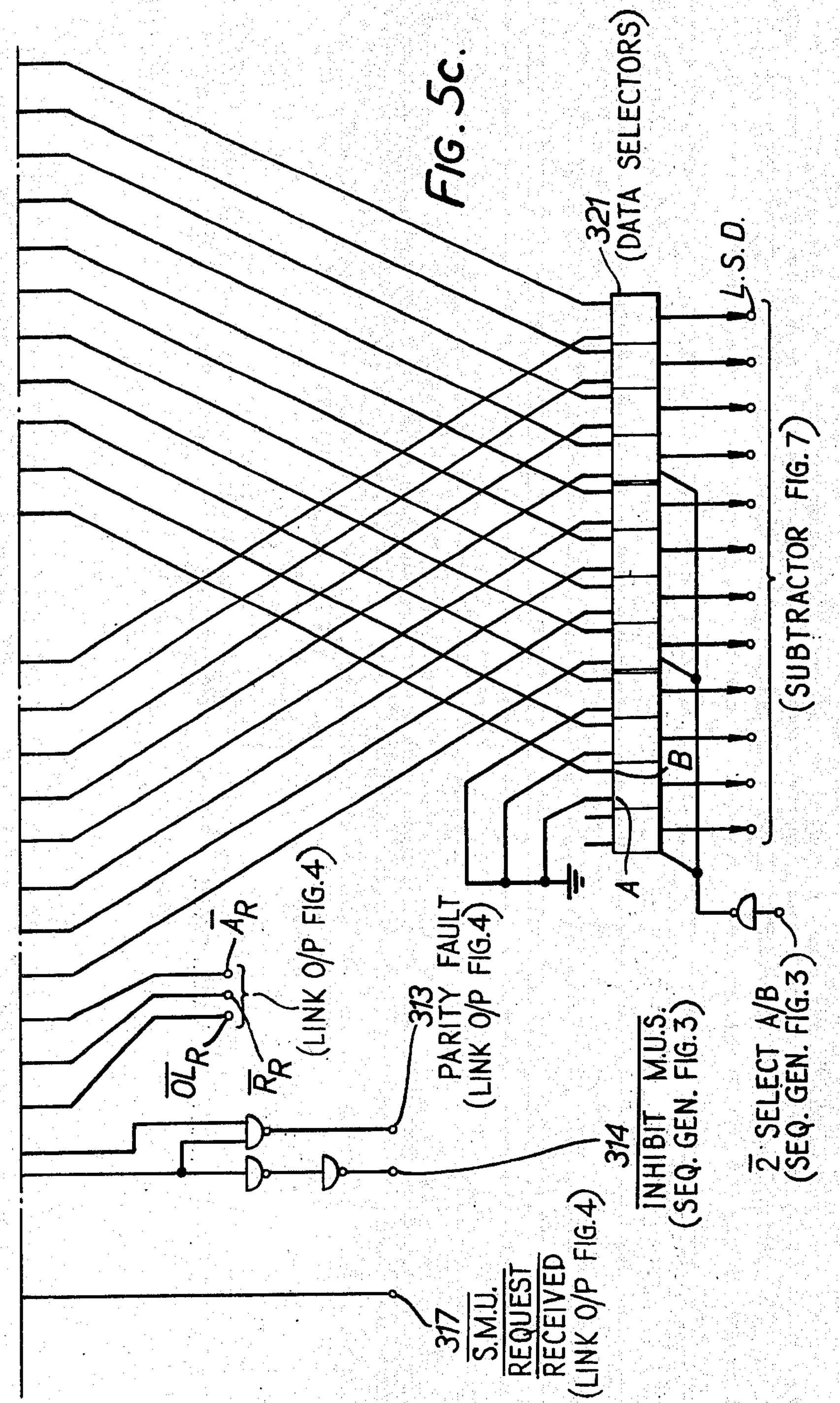
Figure 6A:
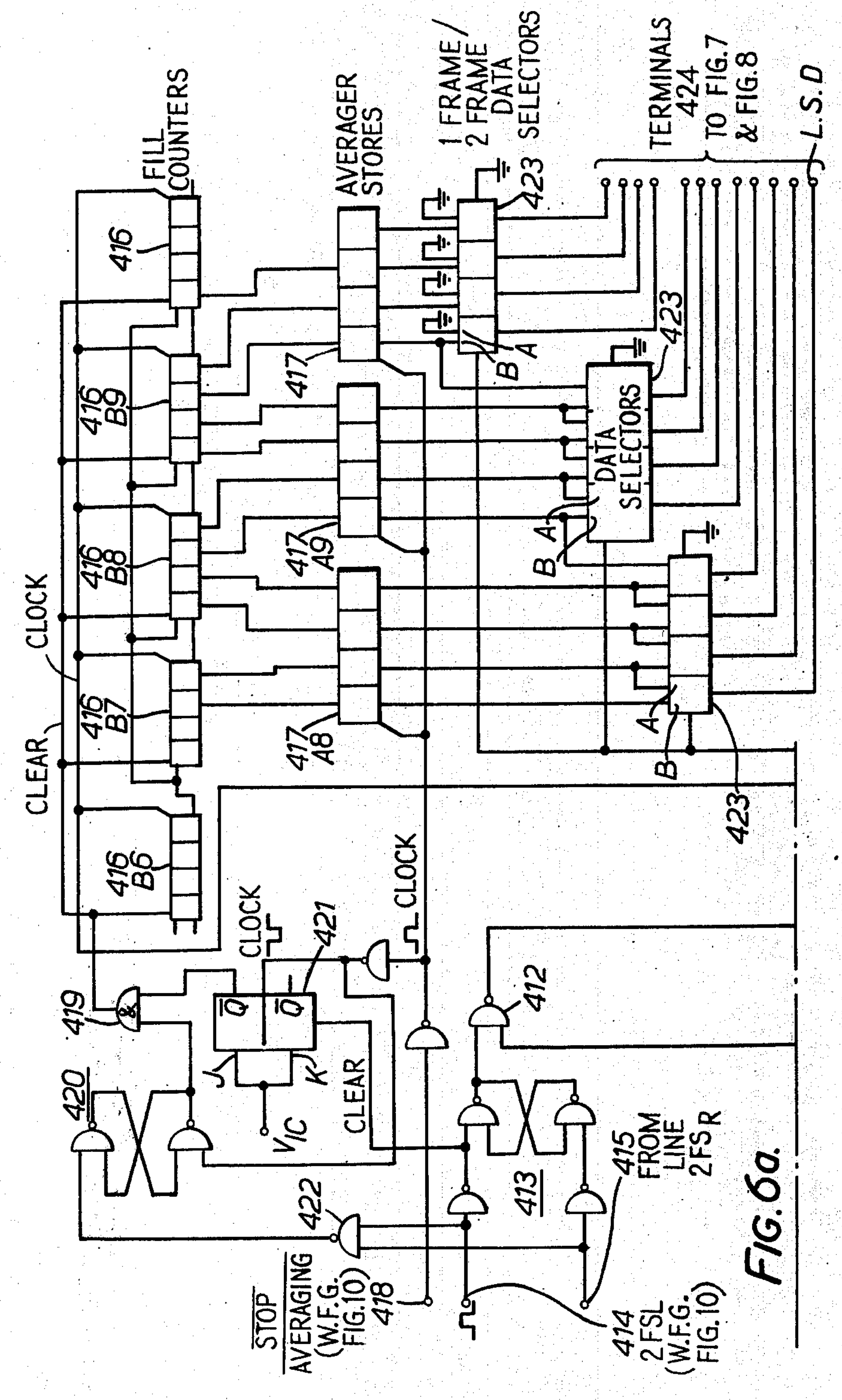
FIGS. 6a and 6b show an averager and programmable delay unit of an embodiment of the invention.
Figure 6B:
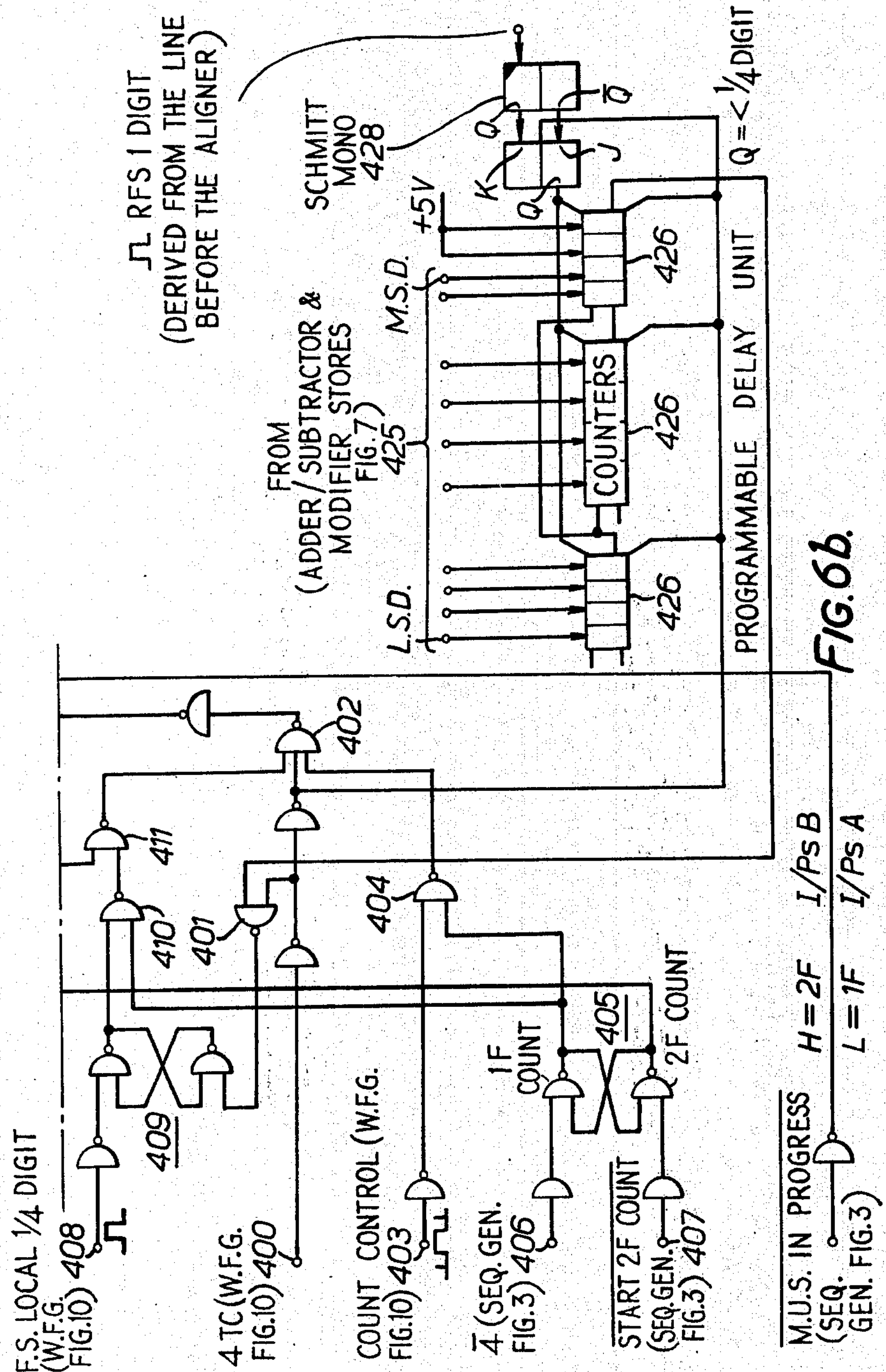
Figure 7A:
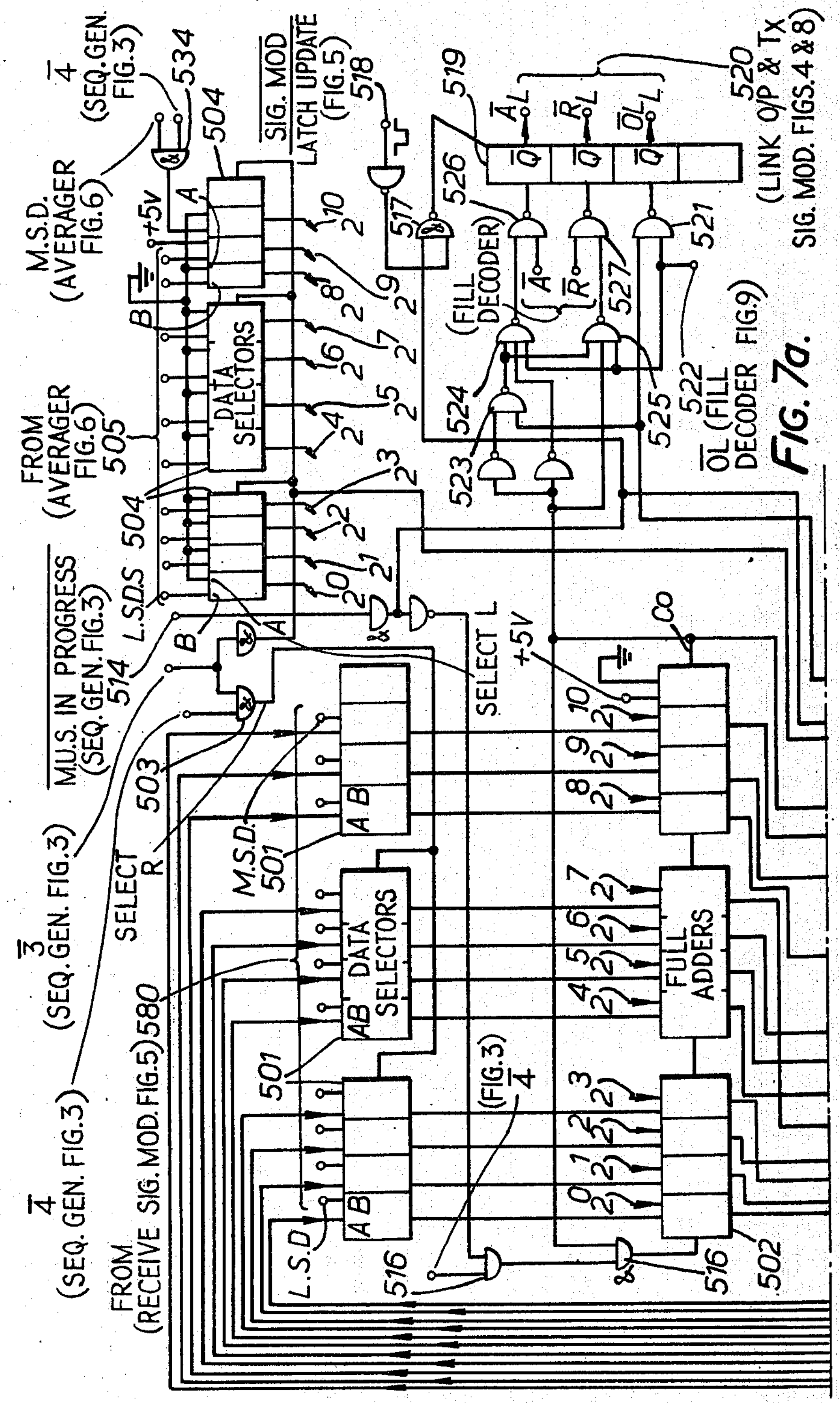
FIGS. 7a and 7b show an adder, substractor and modifier stores of an embodiment of the invention.
Figure 7B:
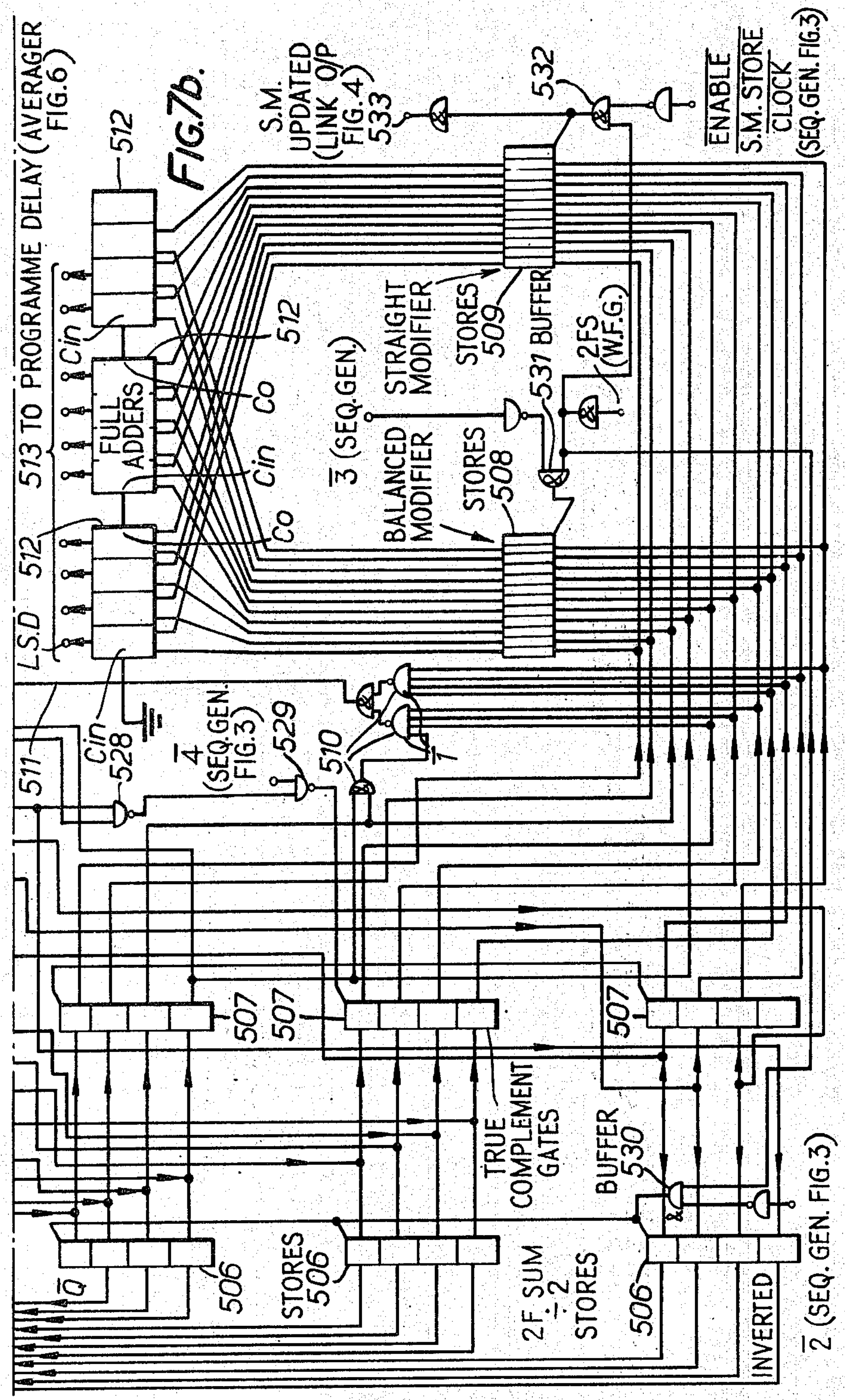

Of this embodiment, FIG. 3 is a sequence generator, FIG. 4 is a link output unit; FIG. 5 is a receive signal module; FIG. 6 is an averager and programmable delay unit; FIG. 7 is an adder/substractor and includes modifier stores; FIG. 8 is a transmit signal module; and FIG. 9 is a fill decoder. The units shown in FIGS. 3 to 9 together constitute blocks numbered 6 to 11 of FIG. 2 to which reference in detail will subsequently be made.

Referring now to FIG. 1 the communication system shown includes five switching centres respectively labelled A, B, C, D and E, which are interconnected by seven links respectively labelled *a*, *b*, *c*, *d*, *e*, *f*, and *g*. Each link includes facilities for transmission in both directions between the switching centres at its ends so that there are in the centre B, for example, three aligners respectively connected to the links *a*, *c*, and *f*. As referred to above, each switching centre includes its own clock oscillator and in addition various switching and/or data processing circuits for handling the digital signals fed to it, the timing of the operations being controlled by the clock oscillator of the particular centre.

FIG. 2 shows in block type diagrammatic form a synchronising unit which is connected to receive the signals incoming from a link and to transmit signals to the link for use at the switching centre at the other end of the link. The signals incoming from the link are applied at 1 to a communication aligner 2 provided for adjusting the timing of the incoming data signals to the timing defined by a local clock 4. The retimed data signals are produced on the conductor 3 for application to switching or data processing circuits (not shown). Framing and synchronising signals included among the data signals incoming from the link are extracted before the signals are fed to the communication aligner 2 by a unit 6 and these signals are used to control the entry of the data into the communication aligner 2 and are also fed to a fill counter 8. The local clock oscillator 4 which is used to extract the data from the communication aligner 2 at the appropriate times is applied to reduce the total in the fill counter 8 and also has an output 5 for determining the timing of the switching and data processing operations within the switching centre. The fill of the communication aligner 2 is measured in the fill counter 8.

Amongst the incoming data and the associated framing and synchronising signals there is received from the switching centre at the other end of the link information relating to the fill of the aligner at that end of the link and also advance (A) and retard (R) signals indicating the inverse of the control being applied to the clock at that end of the link and also a signal indicating that the aligner fill difference at the remote end of the link is "out of limits" (O.L.). This additional information is derived from the incoming data either before alignment by the communication aligner 2, by a circuit 9 as shown in FIG. 2, or after alignment by the communication aligner 2. The fill from the remote end of the link from the circuit 9 and the fill from the counter 8 are compared in a fill difference circuit 10 which produces local advance, retard and out of limits signals as appropriate. The local and remote fills are also applied to a modifier unit 11 which in turn is connected to the fill counter 8 to modify its fill, as will be described in detail later. Both the remote and local advance, retard and out of limits signals are applied to a control comparator 7 before being applied to a common control module 12 provided for controlling the frequency of the oscillator 4. Over a line 13 similar signals from other synchronising units in the switching centre are applied to the common control module 12 so that the control of the oscillator 4 is derived from the signals from every link connected to the switching centre. As the local fill, and advance, retard and out of limits signals are required by the synchronising unit at the remote end of the link, these are sent over conductors 14 and 15 for transmission over the link.

As briefly mentioned above, there are two types of modifier, a balanced modifier which is applied simultaneously at both ends of a link which has the effect of modifying the aligner fills in the same direction so that the fill difference is unchanged. If the requirement for modifier arises as a result of a change in one direction only of the link, then clearly a balanced modifier cannot compensate for such a change and in this case a straight modifier is used. In the embodiment to be described in detail later, if a straight modifier is required at one end of a link then at the same time a calculation of the value of a possible straight modifier at the remote end of the links is also carried out, but of course at the remote end the modifier can have the value zero. The object of the straight modifier is to alter the fills of the aligners so that they are exactly half full (i.e. the fills become one half frame).

In a double-ended synchronisation system of the type with which the invention is concerned, the fill difference is equal to twice the phase difference between the clocks at the ends of the link. This leads to an ambiguity in the measurement of the actual phase error between the clocks since phase errors of $\phi$ and $\phi + \pi$ both result in a fill difference of $2\phi$. When the electrical length of unidirectional delay of the link is known, it is possible to resolve this ambiguity and if the length is $x + 2n\pi$, it is only necessary to measure $x$ because the remainder of the delay has no effect on the phase error. The present invention is concerned with determining the value of $x$ and using this value to calculate the modifier needed to bring to balance the aligner fills at each end of the link about the centre of their range. The local clock 4 generates a frame start signal which is used to start a counter which is stopped by a frame start signal produced by the clock at the remote end of the link and transmitted over the link. The contents of counter after this operation are designated as the local aligner count which is stored and transmitted to the remote end. Similarly the remote aligner count is measured there and received at the local end from the remote end of the link. The unidirectional delay of the link is equal to half the sum of the local and remote aligner counts. Bearing in mind that multiples of $2\pi$ can be ignored, the local count will have an error of $2n\pi$ radians and similarly the remote count will have an error of $2m\pi$ radians, where $n$ and $m$ are any integers. Thus the sum of the counts will have an error of $2(n+m)\pi$ radians and the measured unidirectional delay will therefore have an error of $(n+m)\pi$ radians. This error is unimportant if $n+m$ is even and this can be achieved by arranging for the range of the counters to be a multiple of $4\pi$ radians, using a 2, 4, 6, etc. frame multiframe. In the present example a two-frame multiframe will be considered.

When the local and remote clocks are in phase, the aligner count equals $x$. If the aligner fill can take any value between 0 and F and it is required that the fill be in the middle of its range when the clocks are in phase a modifier is calculated as $\frac{1}{2}F-x$. The modifier so produced is a function of the unidirectional delay of the link and if this changes the modifier will be incorrect, and in extreme cases the result could be that the clocks could attempt to operate out of phase by $\pi$ radians. It is therefore essential that the modifier be checked for validity and updated periodically to ensure that the clocks are in the correct phase. The modifiers may be updated in either of two methods. In the first the modifier calculation may be carried out periodically, every few seconds, say. In the second a modifier may be updated whenever a link failure signal is detected on a link. The first method has the advantage that the modifier can only be badly incorrect for less than the few seconds, but of course following a link changeover a switching centre may be producing invalid information until the modifier is recalculated. The second method overcomes this last difficulty but suffers from the problem that if a link were sufficiently good and that a link failure did not occur for a considerable time the modifiers could become significantly out of date due to temperature variations.

Suppose that the switching centres with which we are concerned are A and B of FIG. 1 and let the clock in switching centre A be regarded as a reference. Suppose the unidirectional delay of the link $a$ is 20 digits and the basic frame vector at switching centre B is lagging by 30 digits. At the initiation of the control over the link with a modifier at zero the count at switching centre A will be 50 digits and that at switching centre B will be 246 digits, assuming that the local frame start vector starts a 256 bit counter and the received frame start vector stops it. At this stage there are two possible aligner counts which could be correct and two possible actions which would result in a fill difference of zero. One is retarding the clock B by 98 digits which would cause the count to become 148 on both ends of the link (but the clocks would then be $\pi$ radians out of phase) or advancing the clock B by 30 digits which would cause the counts to become 20 digits at each end and would put the clocks into phase. Using a two-frame multiframe to generate counts for producing a balanced modifier the counts will be either 25 and 251 or 153 and 123 digit pairs depending upon which frame vectors are designated as the two-frame multiframe vectors. As described above the multiframe counts are exchanged over the link and their sum produced, discarding any multiples of 256 which produces a result of 20. The modifier is then calculated as 128−20=108 and this is loaded into the aligners so that the fill or modified count at A becomes 158 and that at B becomes 98. The fill difference can now be used to generate control signals to bring the clock at B into synchronism with that at A by advancing by 30 digits until the fills at both ends of the link are 128.

It will be appreciated that when the delays in both directions over the link are equal, it is always possible to calculate the balanced modifier which will bring the aligner fills into equality and subsequently the oscillators into phase with each other. However, when the delays are unequal any apparent phase difference between the oscillators will have a component peculiar to the link and without knowing this component the oscillators cannot be bought into synchronism. If this component is ignored then any attempt to bring the clock into synchronism is liable to fail because different links may demand control of the oscillator in the opposite senses. The straight modifier is employed to compensate for the unequal delays in a link and it is calculated in the following manner. As with a balanced modifier two frame counts are established at the both ends of the link and at each end the count is transmitted to the other end of the link so that both two frame counts are available at each end. The two frame counts are added together, multiples of 256 digit pairs being ignored, as with the balanced modifier, and the resulting two frame sum (of digit pairs) has subtracted from it the unmodified local one frame fill (in digits). The resulting straight modifier when combined with a balanced modifier causes the local aligner count to be 128. A similar calculation at the remote end of the link leads to the aligner count there also being reset to 128.

A specific embodiment of the invention will now be described with reference to FIGS. 3 to 10 of the drawings which show components which together constitute the timing extraction circuit 6, a control comparator 7, the fill counter 8, the circuit 9 for extracting information about the remote switching centre, the fill difference calculating circuit 10 and the modifier unit 11 of FIG. 2. The communication system for which the circuits of FIG. 3 to 10 have been designed uses a digit rate of 2.048 MHz with a frame duration of 125 microseconds so that each frame includes 256 digits. The aligner fills are counted in quarter digits so that the fill of a full aligner is 1,024. The quarter digit rate is, of course, 8.192 MHz. The control of the frequency of the clock is such that if the fill difference is less than two digits no control is emitted. Normal advance A and retard R signals are applied to the clock if the fill difference lies between 2 and 3 digits, the effect of these normal control signals being to advance or retard the phase of the clock by 0.032 digit every 16 milliseconds that the signal is applied. If the fill difference exceeds 3 digits then an out of limits (O.L.) signal is produced.

First of all, each of the FIGS. 3 to 10 will be described in detail and then their interaction to operate in accordance with the invention will be described.

Sequence Generator

FIG. 3 shows the circuit diagram of the sequence generator the main component of which is a shifting register 100 having eight stages. Only six stages of this register are utilised but in the example under consideration it was constructed from a standard integrated circuit and has eight stages. The register 100 is not stepped along by clock pulses in the usual way but receives a "1" in the first stage and the existing digits are stepped one place to the right whenever certain conditions are satisfied, the conditions varying according to the stage of the register in which the rightmost 1 is stored. To achieve this result the output of the first stage is passed through a gate 101 to produce a signal $\overline{1}$ which is applied to a gate 102 and thence through gates 103 and 104 to step the 1 in the first stage of the register to the second stage and introduce a second 1 in the first stage. The gate 103 controls the stepping and responds to a signal $\overline{\text{STOPAV}}$ (Stop Averaging) applied to the terminal 105 from the waveform generator (FIG. 10). Similarly the second stage of the register produces from a gate 106 a signal $\overline{2}$ which passes through gates 107, 108 and 109 to an input of the gate 104 to step the 1's in the register 100 on to the third stage. A signal D5 from the waveform generator and applied via a gate 110 to the gate 109 controls the stepping from the second to the third stage. Similarly a signal $\overline{3}$ is derived from a gate 111 and is applied through gates 108, 109 and 104 so that the stepping from stage three to stage four is controlled by the signal D5. A signal $\overline{4}$ is derived from a gate 112 and is applied through a gate 113 for delay purposes to an input of the gate 102 and is thus controlled by the signal $\overline{\text{STOPAV}}$. The gate 102 also receives a signal $\overline{5}$ from a gate 114. Gates 115 to 119 are provided to inhibit the outputs from the stages of the register 100 other than the rightmost containing 1, so that only one of the outputs $\overline{1}$ to $\overline{5}$ appears at any one time. The output of the first stage of the register 100 is also used directly and consequently is not subject to this inhibition. Neither is the output $\overline{6}$ which is derived from the gate 119 and is applied through a gate 120 to reset the shifting register and thereby terminate the outputs from all stages when a monostable trigger circuit 121 is set. A signal $\overline{\text{BMU}}$ (Balanced Modifier Update) is applied via terminal 122 and gate 123 to set the trigger 121 to the one state and also through gate 124 to an input of the gate 104; a signal $\overline{\text{START 2 FRAME COUNT}}$ is also derived from this signal and is fed via gate 125 to terminal 126. A signal $\overline{\text{INHIBIT MUS}}$ (Modifier Update Sequence) is derived from the receive signal module (FIG. 5) and supplied via terminal 127 and gate 128 to a second input of the gate 124. A signal $\overline{\text{SMU CONFIRMED}}$ (Straight Modifier Update) derived from the link output unit (FIG. 4) is applied via a terminal 129 to set a trigger 130 the output of which is combined in gate 131 with a signal $\overline{\text{LOAD PERIOD}}$ derived from the waveform generator (FIG. 10) via terminal 132 and gate 133 to produce an output which is applied to the gate 123. The output of the trigger 130 is also applied to a gate 134 where it is combined with the 4 signal derived from the shift register 100 via a gate 135 to produce an output at terminal 136 via a gate 137, the output being $\overline{\text{ENABLE SM STORE CLOCK}}$ (Straight Modifier) which is fed to the subtractor (FIG. 7). The trigger 130 is reset by a signal $\overline{\text{SM UPDATED}}$ derived from the link output unit (FIG. 4) via terminal 138 and gate 139, this signal also being applied to set another trigger circuit 140 the output of which is combined with the output of the first stage of the shifting register 100 in a gate 141, receiving the signal via a gate 142 and producing an output REMOTE S MOD ERROR at terminal 143 which is applied to the link output unit. The trigger 140 is reset by a signal $\overline{\text{1F}_R\text{FILL=127-129}}$ derived from the fill decoder (FIG. 9) indicating that the one frame fill for the remote aligner lies between 127 and 129, which signal is applied to terminal 144. An output from the first stage of the shifting register 100 is also fed through a gate 145 to produce at terminal 146 a signal $\overline{\text{MUS IN PROGRESS}}$ which is fed to the link output unit, the averager and the subtractor (FIGS. 4, 6 and 7). The signal MUS IN PROGRESS is produced when the register 100 receives an input from gate 104 and it is maintained until the register is reset by an output from gate 120.

In the above described unit and many of the other units, gates are used to equate the signal delays along various paths to produce the correct timing, one such gate being numbered 128, and in subsequent descriptions references to these gates will be omitted to simplify the descriptions. Similarly, other gates such as 135 and 142 are used to invert the signals and in subsequent descriptions reference will not be made to these gates.

Link Output Unit (FIG. 4)

The function of this unit is to take in the advance, retard and out of limits signals for both the local and the remote aligners and derive from them advance and retard control signals for application to the common control module 12 (FIG. 2) used for controlling the clock frequency. Certain other control signals have to be taken into account because they may invalidate the outgoing signals. In addition, this unit is used to produce displays on a node monitor panel indicating the operational state of the particular link.

Local signals representing the $\overline{\text{ADVANCE A}_L}$, $\overline{\text{RETARD R}_L}$ and $\overline{\text{OUT OF LIMITS OL}_L}$ are derived from the sub-tractor (FIG. 7) and are applied to terminals 200, 201 and 202 respectively from which they are fed to inputs of respective gates 203, 204 and 205. Remote signals derived from the receive signal module (FIG. 5), $\overline{\text{ADVANCE A}_R}$, $\overline{\text{RETARD R}_R}$ and $\overline{\text{OUT OF LIMITS OL}_R}$, are applied to respective input terminals 206 to 208 and are fed from there to second inputs of the gates 203 to 205. The outputs of the gates 203 to 205 are controlled by gates 209 to 211 respectively which inhibit the output of the A, R and OL signals to the common control module if the like is non-operative and not both of $A_R$ and $R_R$ are present. Output terminals 212 to 214 are provided for connecting the outputs of the gates 209 to 211 to the common control module. Inverted versions of these outputs are applied to the node monitor panel via terminals 215 to 217. If conflicting control signals are received from the local and remote fill decoding circuits, for example an advance signal from the local circuit and the retard signal from the remote one, these are detected by gates 219 and 220 which together produce an output indicating the existence of a conflict of instructions. This conflict output is applied as an input to the gate 221 where it is combined with a signal INHIBIT SC CHECK (Self-Conflict) and a further signal derived by a gate 222 indicating the simultaneous presence of both $\overline{\text{ADVANCE A}_R}$ and $\overline{\text{RETARD R}_R}$ signals from the receive signal module. The output of the gate 221 is applied as an input to a four-stage shifting register 223 which in conjunction with a gate 224 connected to the output of the first three stages of the register serves to detect the sustained presence of conflicting instructions. The data in the shifting register 224 is shifted along by a signal derived from the receive signal module $\overline{\text{SIG MOD LATCH UPDATE}}$ received over terminal 225 and combined with the output of the gate 222 in a gate 226. A gate 227 combines the output of the gate 224 with a signal ILLEGAL FILL from the fill decoder, a signal SYNCH WORD LOSS derived from the receive signal module (FIG. 5) and the signal MUX FAULT derived from multiplexing equipment indicating a failure in that equipment. These three signals are applied respectively to terminals 228, 229 and 230. The output of the gate 227, which is present during fault free operation, is applied to the transmit signal module (FIG. 8) after inversion as the signal Tx N.ACK (no acknowledgement) via terminal 231 and is also combined in a gate 232 with a signal PARITY FAULT from the receive signal module (FIG. 5) received via a terminal 233. The output of the gate 232 is a signal $\overline{\text{LOCAL FAULT}}$ and after inversion is fed out from the circuit via a terminal 234 to produce a link failure alarm. the signal $\overline{\text{LOCAL FAULT}}$ is also applied to a gate 235 in which it is combined with the signal $\overline{\text{MUS IN PROGRESS}}$ from the sequence generator (FIG. 3) and the output of a gate 236, which receives at its inputs the signal REMOTE S MODE ERROR from the sequence generator and a signal $\overline{\text{N.ACK}}$ derived by a gate 237 in response to the simultaneous presence of all three of the signals $\overline{A_R}$, $\overline{R_R}$ and $\overline{OL_R}$. The output of the gate 236 is also produced as an output from the unit at terminal 238 indicating a remote fault. The output of the gate 235 is a signal $\overline{\text{NON OP}}$ which is fed via a terminal 239 to the common control module and is also combined in a gate 240 with the output of the gate 222 to produce a signal controlling the gates 209, 210 and 211.

A set of two-state devices or latches 241 is provided for maintaining six output indications: Remote Straight Modifier Error (RSME), Non-Operational (NO), Remote Fault (RF), Local Fault (LF), Synchronism Failure (SF) and Straight Modifier (SM). The first four of these signals are received from components to which reference has already been made. The signal SF is received via terminal 242 from the fill decoder (FIG. 9) under the control of the signal $\overline{\text{MUS IN PROGRESS}}$ from the sequence generator, the control being effected by a gate 243. The signal SM is received from the subtractor (FIG. 7) via a terminal 244 as a signal SM UPDATED. The latches 241 are reset by a signal from the node monitor under the control of an operator.

A monostable trigger 245 is set by the local out of limits signal $OL_L$, which trigger imposes a delay on the application of the $OL_L$ signal to set a bistable trigger 246 by means of a gate 247. The set output of the trigger 246 is combined in a gate 248 with signals $\overline{\text{MUS IN PROGRESS}}$ from the sequence generator and SMU REQUEST RECEIVED from the receive signal module (FIG. 5) to produce an output $\overline{\text{SMU CONFIRMED}}$ which is fed to the sequence generator. The reset output of the trigger 246 produces at terminal 249 a signal TRANSMIT SMU REQUIRED to the transmit signal module.

Receive Signal Module (FIG. 5)

The receive signal module staticises a block of 32 digits incoming over the link, performs parity checks on groups of the digits and performs selective transfers of some of the digits depending upon whether the incoming information represents a two-frame or a one-frame fill. The main output from the receive signal module is the remote one or two frame count which is passed to the substractor unit to be described subsequently in relation to FIG. 7.

A group of digits incoming from the link appears at a terminal 300 and is fed into a 32 stage shifting register 301 under the control of synchronising signals also derived from the aligner and applied to a terminal 302. The group of digits fed into the shifting register 301 has at its right-hand end eleven 1's with a 0 in the twelfth place from the right. The next eight places are occupied by an eight bit binary coded number which could be the one-frame fill from the remote end of the link. The twenty-first bit from the right is a parity bit for the eight digits immediately on its right, and the 22nd bit is a 0. The next three bits store the three most significant digits of a two-frame fill, the 8 digits of lower significance occupying the eight stages of the one-frame fill. The next two stages are the advance A and retard R signals from the remote end of the link followed by an IN LIMITS signal IL which is the inverse of an out-of-limit signal OL. The next place is allotted to a digit which when present indicates that the signal represents a two-frame fill and the following digit is 1 when a straight modifier is required to be produced. The 31st digit is a parity check digit for the 23rd to the 30th digits of the group and the 32nd digit is a 0.

A set of remote two-frame stores 303, twelve in number is provided connected to the thirteenth to twentieth stages and twenty-third to twenty-fifth stages of the register 301, with a twelfth store recording the satisfaction or otherwise of the parity checks. The stores 303 will therefore record a two-frame fill if this is received by the shifting register 301, the entry into the stores 303 being controlled by the twenty-ninth digit in the register 301 through gates 304 and 305. It is part of the convention used in the system being described that when a modifier calculation signal is being sent the A,R and IL signals are 1, 1 and 0 respectively, this condition being sensed by a gate 306 the output from which controls the gate 304. The gate 305 is controlled by the reset output of a monostable trigger 307 which is set if any of the first twelve digits and twenty-second and thirty-second digits of the register 301 are in other than the pre-set 0 and 1 conditions as described above, this condition being sensed by a gate 308, the output of which is used to set the trigger 307. A set of remote one-frame stores 309 is provided, the first eight of which are connected to receive the digits from stages thirteen to twenty of the register 301 and the ninth, tenth and eleventh stores respectively receive the A,R and IL signals from stages 26, 27 and 28 of the register 301. As with the remote two-frame stores 303 so the twelfth of the stores 309 records the result of the parity checks. Entry into stages 1 to 8 of the stores 309 is controlled by the output of a gate 312 in response to the output of the gate 304 and the set output of the trigger 307. Entry into stages 9 to 12 of the stores 309 is controlled by the set output of trigger 307 alone. The outputs of the gates 305 and 312 are the inverse of each other because the gate 312 receives the output of the gate 304 directly whereas it is inverted before application to the gate 305. The parity checks are performed by units 310 and 311 in the usual way, these units being for checking the thirteenth to twenty-first and twenty-third to thirty-first stages of the register 301 respectively. The results of the parity checks as recorded in the twelfth stores of the groups 303 and 309 are combined to produce an output on a terminal 313 indicating a parity fault which fed to the link output unit (FIG. 4). A parity failure is also used to produce a signal $\overline{\text{INHIBIT MUS}}$ on terminal 314 which is fed to the sequence generator (FIG. 3) to restart the modifier updating sequence.

A NAND-GATE 315 receives the SM signal from stage 30 of the register 301, a signal indicating that the A, R and IL signals are respectively 1, 1 and 0 from the gate 306, a reset output signal from the trigger 307 and a signal indicating that the parity checks are satisfactory from a gate 316. The output of the gate 315 appears at a terminal 317 and forms the signal $\overline{\text{SMU REQUEST RECEIVED}}$ (SMU=straight modifier update) which is fed to the link output unit (FIG. 4).

The reset output from the trigger 307 after a delay through a number of gates appears at a terminal 318 as a signal $\overline{\text{SIG MOD LATCH UPDATE}}$ which is fed to the subtractor and the link output unit (FIGS. 7 and 4). The output from the gate 308 is also applied to a second monostable trigger circuit 319 the reset output of which appears at terminal 320 as the signal SYNCH WORD LOSS which is fed to the link output unit (FIG. 4).

A further set of twelve gates 321 serve as data selectors and are connected to receive respectively the one or two-frame fills from the stores 309 and 303, binary digits of equal significance from each store being fed to the same ones of the gates 321. Entry into the gates 321 is controlled by the 2 signal from the sequence generator and the outputs of the gates 321 are fed to the subtractor (FIG. 7).

Averager and Programmable Delay (FIG. 6)

The components shown in FIG. 6 perform two functions, one set of components forming an averager by means of which the fill of the local aligner is accumulated sixty-four or one hundred and twenty-eight times and the resulting total is then divided by 64 or 128 by the simple expedient of discarding the six or seven places of lowest significance respectively. The other set forms the programmable delay unit and includes a counter to which is transferred from the subtractor (FIG. 7) the complement with regard to the maximum capacity of the counter of the modifier to be introduced. The programmable delay operates by receiving pulses at four times the clock frequency, that is to say quarter digit pulses, starting from the input of a remote frame start signal received directly from the line, and when the counter is full a trigger is reset to produce a delay remote frame start signal which is used to control the timing operations as will be described later.

Referring now to the Figure, the pulses (4TC) at four times the clock frequency are applied to an input terminal 400 from the waveform generator and are applied to inputs 401 and 402. A count control signal is applied to a terminal 403 and is fed as a second input to the gate 402 after passage through another gate 404. The gate 404 is controlled by the set output of a trigger 405 which is set by a $\overline{4}$ signal applied to terminal 406 from the sequence generator (FIG. 3), which also applies a $\overline{\text{START 2F COUNT}}$ signal via a terminal 407 to reset the trigger 405. A FS LOCAL signal (Frame Start) from the waveform generator supplied via a terminal 408 to set a trigger 409 which is reset by the output of the gate 401. The set outputs of the triggers 405 and 409 are combined as a third input to the gate 402. The control input of the gate 411 in a gate 410 which is applied through a gate 411/is received from a gate 412 which combines the reset output of the trigger 405 with the set output of another trigger 413 which is set by a signal $\mathbf{2FS}_L$ (Two-Frame Start Local) from the waveform generator applied via a terminal 414 and is reset by a signal $\mathbf{2FS}_R$ (Two-Frame Start Remote) derived from the line and applied to FIG. 6 via a terminal 415.

The output of the gate 402 which consists of the four times clock pulses or quarter digit pulses is applied to the input of a counter 416 which as shown consists of five separate four-stage counters (each a proprietary integrated circuit) but may consist of any suitable seventeen stage counter. The six left-hand stages of the counter 416 which correspond to the six digits of lowest significance have no outputs but the eleven stages above them are connected respectively to eleven stages of an averager store 417. Entry into the store is controlled by a signal $\overline{\text{STOP AVERAGING}}$ from the waveform generator and applied via a terminal 418. The counter 416 is cleared by the output of a gate 419 which receives as inputs the reset outputs of triggers 420 and 421. The trigger 420 is set by a combination of the signals $\mathbf{2FS}_L$ and $\mathbf{2FS}_R$ produced by a gate 422 and is reset by the STOP AVERAGING signal. The trigger 421 has its stage changed with every occurrence of the $\overline{\text{STOP AVERAGING}}$ signal and is cleared by the $\mathbf{2FS}_L$ signal after inversion. The averager store 417 has its outputs connected to a corresponding set of data selectors 423, which are connected to the averager store in two different ways and are alternatively enabled depending upon whether the value stored in the averager store 417 represents a one-frame or two-frame fill. The distinction between these two conditions is provided by the signal $\overline{\text{MUS IN PROGRESS}}$ from the sequence generator which is applied to the data selectors 423. The outputs of the selectors 423 are connected to eleven terminals 424 via which the averaged fill is transmitted to the subtractor (FIG. 7) and the transmit signal module (FIG. 8).

A modifier from the adder/subtractor and modifier stores (FIG. 7) is received via terminals 425 and is recorded in a programmable delay counter 426 which is arranged to receive the quarter digit pulses. Entry of the modifier into the counter 426 is controlled by the output of a trigger 427 which is in turn set by a monostable trigger 428 which receives a signal RFS (Remote Frame Start) which is derived from the line before the aligner so that it represents the true time of receipt of the signal. When the counter 426 is filled it produces a carry output pulse from the final (rightmost) stage which enables the gate 401 to pass a quarter digit pulse to reset the trigger 409 and thereby stop the application of quarter digit pulses to the fill counter 416.

Thus following the receipt of a remote frame start RFS signal the quarter digit pulses first fill the counter 426 until it produces an overflow, thus implementing the modifiers. The quarter digit pulses are applied to the fill counter 416 following receipt of signal FS LOCAL until a delayed $RFS_R$ signal is received from the counter 426. This is repeated 128 times and then 1/128th of the accumulated total in the counter 416 is transferred to the stores 417 and the counter 416 cleared in response to the $\overline{\text{STOP AVERAGING}}$ signal.

The trigger 420 forces the total in the counter 416 to be zero if the signals $2FS_L$ and $2FS_R$ overlap.

Adder/substractor and Modifier stores (FIG. 7)

The apparatus shown in FIG. 7 constitutes an adder/-substractor with a recirculation path for enabling the addition and subtraction operations required to calculate the modifiers to be carried out. As mentioned, above, the modifiers are maybe either balanced modifiers or straight modifiers and separate stores are provided for these. The sum of the modifiers is formed in a separate adder for application to the programmable delay counter 426 of FIG. 6. The circuit also generates the local out of limits signal $\overline{OL_L}$ whenever the fill difference exceeds 12 quarter digits.

A remote fill is received from the Receive Signal Module (FIG. 5) and is applied via terminals 500 to one set of inputs of data selectors 501. The outputs of the selectors 501 are applied respectively to inputs of stages of a full 12-bit parallel adder 502 under the control of a signal SELECT R produced by a gate 503 in response to signals $\overline{3}$ and $\overline{4}$ from the sequence generator (FIG. 3). Second inputs to the stages of the adder 502 are produced by further data selectors 504 which receive at input terminals 505 the local aligner fill from the averager (FIG. 6). To the other input terminals of the selectors 504 is applied the number 512 (a 1 in the $2^9$ stage). The selectors 504 are controlled by a signal SELECT L derived from the $\overline{3}$ signal from the sequence generator. The sum outputs of the adders 502 are applied in parallel to respective stores 506 and also to respective true/complement gates 507. The outputs of the stores 506 are the inverses of the input digits and are connected to second inputs of the data selectors 501 with a one place shift to the right so as to produce a division by two of the stored numbers and a change of sign (completed by the end-around carry of adder 502). The outputs of the gates 507 are connected to the inputs of respective stores 508 for a balanced modifier and stores 509 for a straight modifier. A combination of gates 510 is also connected to the outputs of the gates 507 to produce an output on conductor 511 whenever the number produced at the outputs of the gates 507 equals or exceeds 12. A further full adder 512 having 12 stages in parallel is connected to the outputs of the stores 508 and 509 to produce at output terminals 513 the sum of the modifiers stored in the stores 508 and 509. The sum of the modifiers is applied to the programmable delay counter 426 (FIG. 6).

The signal $\overline{\text{MUS IN PROGRESS}}$ from the sequence generator is applied via a terminal 514 to a gate 515 where it is combined with the signal 4 and is used to control by means of the gate 516 the end-around carry of the adder 502. A gate 517 combines the signal $\overline{\text{MUS IN PROGRESS}}$ with the signal $\overline{\text{SIG MODE LATCH UPDATE}}$ from the receive signal module (FIG. 5) and applied via a terminal 518. The output of the gate 517 is used to update a set of stores 519 which record the signals $A_L$, $R_L$ and $OL_L$ for application via terminals 520 as their inverses to the link output unit and the transmit signal module. The store for the signal $OL_L$ is set by the output of a gate 521 which receives as inputs a signal $\overline{OL}$ from the fill decoder (FIG. 9) via a terminal 522 and a signal indicating that the difference equals or exceeds 12 from the gates 510 via the conductor 511. The conductor 511 is also connected to a gate 523 which receives the output of the fourth least significant digit of the gates 507 so that the gate 523 produces an output if the value passed by the gates 507 equals or exceeds 8 and is below 12. The output of the gate 523 is applied to an input of gates 524 and 525 which receive as inputs the upright and inverted carry output from the adder 502 and also the $\overline{OL}$ signal applied to the terminal 522. The output of the gate 524, which indicates that an advance of phase is required of the clock, is combined in gate 526 with an $\overline{A}$ signal from the fill decocer, and the output of the gate 525, which indicates that a phase retard is required of the clock, is combined in gate 527 with the $\overline{R}$ signal from the fill decoder. The gates 526 and 527 are connected to respective ones of the stores 519.

On account of the left-hand shift built into the stores 506 and their connection to the data selectors 507, the most significant digit store 506 is connected to receive the carry output of the adder 502, which output is also combined in a gate 528 with the SELECT L signal and the output of the gate 528 is combined in a gate 529 with the 4 signal from the sequence generator to produce an output which controls the sense of transfer of the gates 507.

The stores 506 are controlled by the output of a gate 530 which receives as inputs the inverse of the signal 2 from the sequence generator and the signal 2FS from the waveform generator. The balanced modifier stores 508 are controlled by the output of a gate 531 which receives as inputs the signal 2FS and the inverse of the signal 3. The stores 509 for the straight modifier are controlled by the output of a gate 532 which receives as inputs the signal 2FS and the inverse of the signal $\overline{\text{ENABLE SM STORE CLOCK}}$. The output of the gate 532 is also used to produce a signal SM UPDATED which is fed via a terminal 533 to the link output unit (FIG. 4).

The most significant digit stage of the data selectors 504, which is used and is connected to the $2^{10}$ stage of the adder 502, is connected to receive from a gate 534 a combination of the signal 4 from the sequence generator and a signal MSD (most significant digit) from the corresponding selector 423 of the averager (FIG. 6).

Transmit Signal Module (FIG. 8)

The function of this module is to receive the local fill information and the $A_L$, $R_L$ and $OL_L$ signals and construct from them a block of data for transmission to the remote end of the line. The module includes means for constructing parity digits for checking the accuracy of transmission of the data and for adding the 1 and 0 signals in the standard positions as required by the receive signal module (see description of FIG. 5). The two-frame and straight modifier signals are also incorporated in the transmitted group.

The main component of this module is a 32 stage shifting register 600 from which the group of digits is transmitted to the line via terminal 601 under control of clock signals from the waveform generator applied to a terminal 602. The clock signals are also transmitted to line through terminal 603. A signal $\overline{\text{LOAD PERIOD}}$ enabling the loading of information into the shifting register 600 is applied to it from the waveform generator via terminal 604. The fill information is fed to the module via terminals 605 from the averager (FIG. 6) and in addition to being connected directly to the appropriate stages of the shifting register 600, these terminals are connected to inputs of parity generators 606 and 607 which generate the appropriate parity digits for incorporation in the digit group to be transmitted. If the fill being transmitted is a two-frame fill a signal indicating this fact is generated by a gate 608 in response to signals $\overline{2}$ and $\overline{\text{MUS IN PROGRESS}}$ both from the sequence generator (FIG. 3). A gate 609 also receives the $\overline{\text{MUS IN PROGRESS}}$ signal together with $\overline{\text{TRANSMIT SMU REQUIRED}}$ from the link output unit and TRANSMIT NACK from the same unit. The output of the gate 609 controls gates 610, 611 and 612 through which pass the locally generated $\overline{A_L}$, $\overline{R_L}$ and $\overline{OL_L}$ signals to corresponding stages of the shifting register 600. A further gate 613 receives the signals $\overline{\text{MUS IN PROGRESS}}$ and $\overline{\text{TRANSMIT SMU REQUIRED}}$ and controls a gate 614 connected in the output of the gate 612. The function of the gates 609 to 614 is to permit the transmission of the $A_L$, $R_L$ and $OL_L$ signals when necessary and to superimpose on them the values of 1, 1 and 0 respectively when a modifier update sequence is being performed, or the values 1, 1 and 1 respectively when a NACK signal is to be transmitted the receive signal module responding to this group to treat the received data as a one or two-frame fill or invalid information as appropriate.

Fill Decoder (FIG. 9)

The fill decoder is connected to receive indications of the value or range of values in which the local and remote fill lies and produces from this information the local advance, retard and out of limits signals as set out in Table 1. The decoder also generates signals F and I which stand respectively for illegal fill and self-conflict check inhibit.

The components of the fill decoder fall into seven more or less independent circuits and for convenience these circuits will be described separately.

Referring now to FIG. 9(*a*), the circuit receives the digits of the local fill from the averager over terminals 700 and produces by means of a simple combination of gates outputs on terminals 701, 702, 703, 704 and 705 of which those on terminals 701, 702, 704 and 705 indicate that the fill is 255, 254, 1 and 0 respectively and that on terminal 703 indicates that the fill is not one of these four values and consequently lies in the range 2 to 253; the term $N_L$ is used for a signal indicating that the local fill lies in this range.

The circuit 9(*b*) receives the $\overline{\text{STOP AVERAGING}}$ signal from the waveform generator on terminal 710 and includes some gates and two monostable triggers which respond to the change in the local fill from 0 to 255, and from 255 to 0, within 3.2 seconds to produce at output terminal 711 the SYNCH FAIL signal which is fed to the link output unit.

TABLE 1

| F | B | R | Ol | I | LOCAL FILL | REMOTE FILL |
|---|---|---|---|---|---|---|
| 0 | 0 | 1 | 1 | 1 | 0 | 0 |
| 0 | 0 | 1 | 1 | 0 | 0 | 1 |
| 0 | 0 | 1 | 1 | 0 | N | 1 |
| 0 | 0 | 1 | 1 | 0 | 254 | 0 |
| 0 | 0 | 1 | 1 | 0 | 254 | 1 |
| 0 | 0 | 1 | 1 | 0 | 254 | N |
| 0 | 0 | 1 | 1 | 0 | 254 | 255 |
| 0 | 0 | 1 | 1 | 0 | 255 | 0 |
| 0 | 0 | 1 | 1 | 0 | 255 | 1 |
| 0 | x | x | x | 0 | N | N |
| 0 | 1 | 0 | 1 | 0 | 0 | 254 |
| 0 | 1 | 0 | 1 | 0 | 0 | 255 |
| 0 | 1 | 0 | 1 | 0 | 1 | 0 |
| 0 | 1 | 0 | 1 | 0 | 1 | N |
| 0 | 1 | 0 | 1 | 0 | 1 | 254 |
| 0 | 1 | 0 | 1 | 0 | 1 | 255 |
| 0 | 1 | 0 | 1 | 0 | 255 | 254 |
| 0 | 1 | 0 | 1 | 1 | 255 | 255 |
| 1 | 0 | 0 | 1 | 0 | 0 | N |
| 1 | 0 | 0 | 1 | 0 | 1 | 1 |
| 1 | 0 | 0 | 1 | 0 | N | 0 |
| 1 | 0 | 0 | 1 | 0 | N | 255 |

TABLE 1-continued

| F | B | R | Ol | I | LOCAL FILL | REMOTE FILL |
|---|---|---|---|---|---|---|
| 1 | 0 | 0 | 1 | 0 | 254 | 254 |
| 1 | 0 | 0 | 1 | 0 | 255 | N |
| 0 | 1 | 0 | 1 | 0 | N | 254 |

N.B. Any fill in the range 2–253 inclusive

The circuit FIG. 9(*c*) performs the same function for the remote fill as does the circuit FIG. 9(*a*) for the local fill, the remote fill being applied to terminals 720 from the receive signal module. FIG. 9(*c*) has output terminals 721, 722, 723, 724 and 725 which correspond respectively to the terminals 701, 702, 703, 704 and 705 of FIG. 9(*a*) and produce corresponding outputs for the remote fill. FIG. 9(*c*) includes some additional gates, however, since it is required to produce an output $\overline{\text{IF}_R \text{ FILL 127-129}}$ on terminal 726 for application to the sequence generator for checking the implementation of a straight modifier. This last signal is produced when the remote fill has the value 127, 128 or 129. The term $N_R$ is used to indicate the signal generated on terminal 723 whenever the remote fill lies in the range 2 to 253.

FIG. 9(*d*) consists of two identical circuits one of which produces on terminal 730 the signal $\overline{A}$ indicating that the local oscillator is required to advance its phase and the other of which produces on terminal 731 the signal $\overline{R}$ which indicates that the local oscillator is required to retard its phase. As shown in Table 1 the signal $\overline{A}$ is produced if the local fill is 1 and the remote fill has any value except 1, if the local fill is 0 or 255 and the remote fill is 254 or 255, or if the local fill lies in the range 2 to 253 and the remote fill is 254. Similarly the signal $\overline{R}$ is produced if the local fill is 254 and the remote fill has any value except 254, if the local fill is 0 or 255 and the remote fill is 0 or 1, or if the local fill lies in the range 2 to 253 and the remote fill is 1. It should be borne in mind that the signals $\overline{A}$ and $\overline{R}$ from the circuits of FIG. 9(*d*) are not directly to the common control module but in dependence upon the fill difference being at least 12, this gating being performed by gates 524 and 525 in the subtractor.

The function of the circuits of FIG. 9(*d*) is to resolve possible ambiguities in the generation of advance and retard signals which could arise when either or both fills are outside the range 2 to 253.

The circuit FIG. 9(*e*) is used to generate on terminal 740 the signal INHIBIT SC CHECK which is referred to as I in Table 1 and is used to inhibit the self-conflict check which is produced whenever the local and remote fill are both 0 or both 255. The operation of the simple logical circuit used to achieve this is straightforward and is believed to require no further description. Like FIG. 9(*d*) this circuit is provided to overcome ambiguities when the fills have extreme values.

FIG. 9(*f*) consists of a single AND-gate which receives as inputs the signals $N_L$ and $N_R$ and produces as output on terminal 741 the signal $\overline{OL}$ signifying that the aligner fill difference is out of limits. It will be apparent from a consideration of the operation of this gate that the signal $\overline{OL}$ is produced whenever both the local and remote aligner fills lie in the range 2 to 253. The signal $\overline{OL}$ is applied to the subtractor (FIG. 7) where it is used to produce the local out of limits signal $\overline{OL_L}$ whenever the fill difference exceeds 12.

FIG. 9(*g*) includes six storage circuits 750 which control respective panel lamps for indicating to an operator particular combinations of the local and remote fills which may require certain actions on his part. Since all of these combinations should not occur during any normal functioning of the system they are also combined in a gate 751 to produce the illegal fill signal on terminal 752 for application to the link output unit. The illegal fill signal is indicated in Table 1 by the reference F which makes it clear that it is generated whenever one or both of the local and remote fills is at an extreme value. The stores 750 are cleared by a reset signal generated by a gate 753 under control of the operator.

Waveform Generator (FIG. 10)

FIG. 10 shows the waveform generated by the waveform generator, but because there is no particular way in which these waveforms must be generated, details of the actual circuitry to produce the waveforms are not shown. As referred to above, the clock frequency is 2.048 MHz and the basic signals used in the system are of 4 times clock frequency, that is to say, 8.192 MHz. A frame has 256 digits in the form of 32 words or slots of 8 digits, with the result that the frame duration is 125 microseconds.

Referring now to FIG. 10, the first waveform shown in the FRAME START signal which occupies the first digit on slot 0 in each frame. The second waveform shown in the synchronising bit D5 which occurs during the fifth digit of slot 0 in alternate frames. The 2 FRAME START signal (2FS) includes pulses at half the frequency of the FRAME START signal and synchronised with the pulses of that signal but in frames intervening the frames during which the D5 signal is generated.

The COUNT CONTROL signal consists of three pulses in each frame. The first pulse is of one-quarter digit duration centred on the mid point of the 31st digit in a frame. The third pulse is of similar duration centred on the mid point of the 224th digit of the frame, and the third pulse is of 63¼ digits duration i.e. almost one-quarter frame, starting one-eighth of a digit before the mid point of the 96th digit and finishing one-eighth of a digit after the mid point of the 159th digit of the frame. This signal is used to gate quarter digit pulses to the fill counter 416 during the normal operation of the system, as distinct from updating modifiers.

The LOAD PERIOD signal consists of pulses of one digit duration in the first digit position of slot 0 of a frame and separated by 8 milliseconds. As the duration of a frame is 125 microseconds, it follows that the LOAD PERIOD signal is generated every 64th frame. It is used in the sequence generator and the transmit signal module. The STOP AVERAGING signal is generated at 128 frame intervals and occupies the fifth digit of the 31st slot in a frame. It is used to stop the averaging of the local fill and also to step along the sequence generator. The 2 ms CONTROL signal consists of 2 milliseconds pulses generated at 16 millisecond intervals starting with the beginning of the frame immediately following the pulses of the STOP AVERAGING signal. The 2 ms CONTROL signal is used for controlling the frequency of the clock oscillator in response to the A and R signals. For example, if an A signal is produced, indicating that the phase of the clock would be advanced, then during the 2 milliseconds of the pulses of the 2 ms CONTROL signal the frequency of the clock oscillator is increased slightly so that at the end of the 2 millisecond pulse the phase of the clock oscillator x has advanced by 0.032 digit periods.

The BALANCED MODIFIER UPDATE signal is generated during the sixth digit of the 31st slot of a frame and is repeated every 1.6 seconds, that is to say, every 12,800 frames. There are ten of such signals staggered in time by 0.16 seconds and used for updating the balanced modifiers of different lines connected to a switching centre. If only three lines are connected to a particular switching centre, then of course only three different BALANCED MODIFIER UPDATE signals would be generated. The object of using signals staggered in this way is to permit the switching centre to remain synchronised with other centres as a result of the control over the other lines whilst a particular line is being updated. It will be evident that the BALANCED MODIFIER UPDATE signal pulses follow the pulses of the STOP AVERAGING signal.

NORMAL OPERATION

During the normal operation of the system, that is to say when no modifiers are being produced, the REMOTE FRAME START signal (RFS) is applied through the triggers 427 and 428 to cause the counter 426 to start counting quarter digit pulses. After a delay corresponding to the existing modifier the final stage of the counter 426 produces as output signal which resets the trigger 409. The trigger 409 is set by the LOCAL FRAME START signal so that the gate 402 is able to pass signals during the count control signal. Thus the fill counter 416 receives quarter digit pulses for the time interval between the receipt of the LOCAL FRAME START signal and the REMOTE FRAME START signal after modification by the programmable delay counter 426 so that the counter 416 records a fill representing this time period. This proceeds for 128 frames when it is stopped by the STOP AVERAGING signal.

The fill in the counter 416 is applied to the data selectors 504 with a seven digit shift to effect division by 128. The averaged fill is also transmitted to the other end by means of the transmit signal module. In the adder/subtractor the remote fill is derived from the receive signal module as a one-frame fill which is applied to the adder 502 via the selectors 501 is subtracted from the local fill. The resulting fill difference produced by the adders 502 is analysed by the gates 510, 524 and 525 and the fill decoder (FIG. 9) to determine what, if any, control signal should be applied to the clock. As explained above, the gates 510 produce an output if the fill difference equals or exceeds 12 (quarter digits) corresponding to a three digit difference which causes the production of an out of limit signal. The circuitry shown in FIG. 9(*d*) and the gates 524 and 525 cause the production of Advance A and Retard R signals if the fill difference is positive or negative and greater than 12. The A and R signals from the fill decoder are controlled by the out of limits signal from the fill decoder so that they are only produced if either fill is or both fills are outside the range 2 – 253.

Balanced Modifier

The generation of a balanced modifier will now be considered. As will be apparent from the form of the balanced modifier update waveform (BMU) described above with reference to FIG. 10, a balanced modifier is recalculated for each link every 1.6 seconds. During the time taken to recalculate the balanced modifier synchronisation control from that link is inhibited.

Consequently at an exchange with more than one synchronisation control link the times at which balanced modifiers are recalculated are staggered so that there is always at least one link controlling the exchange clock, this being the reason for the set of identical staggered waveforms shown in FIG. 10.

At the start of a sequence of operations for recalculating the balanced modifier the signal $\overline{\text{BMU}}$ is applied to the terminal 122 of the sequence generator (FIG. 3) and is routed through gates 124 and 104 to step a digit into the first stage of the shifting register 100 which causes the generation of a signal $\overline{\text{MUS IN PROGRESS}}$ which is applied to the link output unit, averager and subtractor (FIGS. 4, 6 and 7) until the register 100 is cleared at the end of an updating sequence. In the link output unit (FIG. 4) the signal $\overline{\text{MUS IN PROGRESS}}$ sets the local link end to the nonoperative condition (NON-OP) and inhibits the control information, that is to say the Advance A, Retard R and Out of Limits OL signals to the COMMON CONTROL MODULE (CCM) by means of the gates 209 to 211. An illegal fill fault is also inhibited. In the adder/subtractor (FIG. 7) the signal $\overline{\text{MUS IN PROGRESS}}$ inhibits the updating of the local control information A, R and OL, in response to the signals derived from the link and it also inhibits an end around carry for the adder 502 by means of the gate 516. In the averager (FIG. 6) the two-frame output of the one frame/two frame data selectors 423 is selected, and in the transmit signal module the local control information A, R and Out of Limit signals are set to 110 in the word to be transmitted over the link. As explained above with reference to FIGS. 5 and 8, the existence of the signals A, R and OL as 110 indicates that a modifier updating sequence is in progress. A two-frame count is also started in the fill counters 416 of the averager under the control of the signal $\overline{\text{START 2F COUNT}}$ derived directly from the $\overline{\text{BMU}}$ signal in the sequence generator. In the averager the START 2F COUNT signals set the trigger 405 which permits the four times clock signals (4TC) from the local clock oscillator to be fed through the gate 402 into the fill counters 416. The actual duration of a single counting operation by the counters 416 is controlled by the trigger 413 to be the interval of time between the local 2-FRAME START signal ($2FS_L$) from the waveform generator and the remote 2-FRAME START signal ($2FS_R$) which is derived from the line. The circuitry for applying the local 2-FRAME START signal to the line and deriving remote 2-FRAME signal from the line is not shown, but as described above these signals are exchanged over the link as soon as both ends have started the sequence of updating a modifier. The fill counters 416 receive a quarter digit pulses for 64 periods of duration equal to the time interval between the local and remote 2-FRAME START signals. A STOP AVERAGING signal from the waveform generator is now applied to the sequence generator and causes a second 1 to enter the shifting register 100 so that there is now a 1 in the second stage of the register so that the signal $\overline{2}$ is generated and is applied to the receive signal module, the subtractor and the transmit signal module. In the receive signal module the signal $\overline{2}$ causes the selection of the remote 2-frame fill in the data selectors 321. It will be appreciated that the incoming fill information is stored in both of the stores 303 and 309 but since it can be interpreted correctly only as a two-frame fill the data stored in the stores 309 is ignored. In the transmit signal module the signal $\overline{2}$ causes a 1 to be inserted in the 29th digit of the shifting register 600 which, after transmission over the link indicates that the fill number stored in digits 13 to 20 and 23 to 25 is a two-frame fill. Thus the two-frame fill is averaged over 64 two-frame intervals and the average value selected by the averager stores 417 is then transferred through the selectors 423 to the transmit signal module for storage in the stages of the shifting register 600, and to the adder/subtractor where they are applied to the full adder 502 via the data selectors 504. The remote two-frame fill is applied from the stores 303 via the selectors 321 to the adder/subtractor (FIG. 7) where it is fed to the full adder 502 by means of the selectors 501. The signal $\overline{2}$ removes the inhibit on the stores 506 so that these are able to receive the output of the adder 502 and shift it by one ditit place to the right so that what is stored is half of the sum of the two-frame fills.

The signal 2-FRAME START (2FS) from the waveform generator clocks the output of the adder 502 into the stores 506 by means of the gate 530.

The signal D5 from the waveform generator now causes the sequence generator to step a further 1 into the shifting register 100 and therefore into the third stage of it so that the signal $\overline{3}$ selects the output of the stores 506 and the number 512 from the selectors 504 as the inputs to the adders 502. It also causes the selection of the complementary output of the true/complement gates 507 and removes the inhibit on the clock line to the stores 508 for the balanced modifier so that the complement of the sum of 512 and half the sum of the local and remote two-frame fills is stored in the stores 508, the actual transfer being effected under the control of signal 2FS.

The signal D5 from the waveform generator now steps another 1 into the shifting register 100 of the sequence generator so that the signal $\overline{4}$ is generated, which signal when applied to the averager switches it back to one-frame counting by resetting the trigger 405. The STOP AVERAGING signal now causes the 1 in the shifting register 100 to move to the fifth and then to the sixth stage with the successive entry of two further 1's. The signal $\overline{6}$ from the sixth stage of the register 100 clears the register and permits the normal synchronisation of the link to be re-established by terminating the signal $\overline{\text{MUS IN PROGRESS}}$.

Having now produced a balanced modifier in the stores 508, this is combined in the adder 512 with any straight modifier which may be required, but in the present instance is assumed not to be needed, so that a combined modifier is generated and applied to the counters 426 of the programmable delay unit (FIG. 6). It will be apparent from the fact that the gates 507 were set to provide a complementary output that the modifiers are in fact stored as their complements and it is these complements which are stored in the counter 426.

The operation of the programmable delay unit is such as to impose a delay corresponding to the value of the modifier or modifiers on a received REMOTE FRAME START signal (RFS) derived from the line before the aligner and applied to the counter 426 by means of the triggers 427 and 428. This causes the entry of the complementary modifier into the counter 426 which then counts quarter digit pulses received via the terminal 400 until a carry is produced from the final stage of the counter 426, which is applied through gate 401 to reset the trigger 409.

Straight Modifier

If a straight modifier is required, a signal $\overline{\text{SMU CONFIRMED}}$ is produced by the gate 248 of the link output unit when a straight modifier UPDATE REQUEST signal has been received by the receive signal module, and the link has been out of limits of 3.2 seconds timed by the monostable trigger 245. The signal $\overline{\text{SMU CONFIRMED}}$ sets the trigger 130 of the sequence generator which removes the inhibition from the gates 131 and 134 so that a LOAD PERIOD signal from the waveform generator can be used to apply a signal to the shifting register 100. As described above with reference to the balanced modifier when there is a 1 in the first stage of the register 100 the signal $\overline{\text{MUS IN PROGRESS}}$ is generated and the balanced modifier sequence described above ensues until the 1's in the shifting register 100 occupy the first four stages of the register and the signal $\overline{4}$ is being produced.

The signal $\overline{4}$ is applied to the averager and switches it back to single frame counting by re-setting the trigger 405. The signal $\overline{4}$ is also applied to the adder/subtractor and causes the selectors 501 to select the output of the stores 506 as an input to the adder 502. The second input to adder 502 is the local 2 frame count from the averager with the most significant digit inhibited by gate 534. The signal $\overline{4}$ also enables the end-around carry of the 502 by enabling the gate 516. At the same time the true output of the true/complement gates 507 is selected by an output from the gate 529. The sequence generator now issues the ENABLE SM STORE signal from the trigger 130 under the control of the gate 134, which signal enables the output of the adder 502 to pass through the gates 507 into the stores 509. A 2FS signal from the waveform generator now reads the output of the gates 507 into the straight modifier store 509 and causes the issue of a SM UPDATED signal to the link output unit. As described above, the straight modifier in the stores 509 is added to the balanced modifier from the stores 508 in the adder 512 and the total is applied to the programmable delay counter 426. As with the balanced modifier the straight modifier is in complementary form and so also is the total.

In the link output unit the signal SM UPDATED is inverted and applied to the sequence generator where it re-sets the trigger 130 and sets the trigger 140. The re-setting of the trigger 130 closes the gate 134, thus terminating the ENABLE SM STORE CLOCK signal. The setting of the trigger 140 results in the generation of a REMOTE STRAIGHT MODIFIER ERROR signal unless the trigger is re-set by a signal $\overline{\text{IF}_R\ \text{FILL 127–129}}$ from the fill decoder (FIG. 9*c*). This last signal is generated if the remote fill lies within the range 127 to 129 and the action of the trigger 140 constitutes a check that the remote straight modifier has correctly adjusted the fill at the remote end of the link. The link output unit responds to the generation of a REMOTE STRAIGHT MODIFIER ERROR signal to produce an indication to an operator. Two successive STOP AVERAGING signals from the waveform generator to the sequence generator cause the digit in the shifting register 100 to step to stage 5 and 6 which as before results in the clearance of the sequence generator.

The basis of the calculation of the straight and balanced modifier will now be given to enable the reasons for the operations described above, particularly those in the subtractor, to be understood. When it is desired to recalculate a modifier the hypothetical aligners operate on a two frame multiframe. The count is quantized in one-quarter digit steps and 11 bits are required to define the complete range of possible counts (0 to 2047 quarter digits). This count plus a signal (A, R and OL being 1, 1 and 0 respectively) to indicate that it is to be used for path length calculations and not for the derivation of control information is sent to the remote end, where the counts are added and any multiples of 2048 quarter digits are removed from the sum by allowing it to contain only 11 binary digits. The result is then divided by two to give the unidirectional link delay, *d*, in quarter digits with an error of ±⅛ bit due to quantization. This delay is in the range 0 – 1023 quarter digits.

The modifier, *m*, is then calculated as 512 – *d* (where *d* is in quarter digits) and the result is added to all aligner counts made on that link for control generation. The range of *m* is –511 to +512. The adder/subtractor unit produces the difference between the local and remote one frame modifier counts and produces control signals from the difference. It calculates the Balanced Modifier (BM) according to the equation:

$$\text{B.M.} = 512 - (2\text{FS}/2) \qquad \text{(i)}$$

(512 = one frame centre to one-quarter bit quantization)

(2FS/2) = half of the sum of the unmodified two frame fills) and calculate the Straight Modifier (SM) according to the equation:

$$\text{S.M.} = (2\text{FS}/2) - f \qquad \text{(ii)}$$

($f$ = unmodified one frame fill)

Equation (ii) is derived from $$\bar{\bar{f}} = \text{BM} + \text{SM} + f \quad (\bar{\bar{f}} = \text{modified one frame count})$$

or $$\bar{\bar{f}} = f + (512 - (2\text{FS}/2) + \text{SM}$$

but $\bar{\bar{f}}$ is forced to the centre of the one frame period at SM update therefore $$\bar{\bar{f}} = 512 = f + (512 - (2\text{FS}/2) + \text{SM}$$

Hence:

$$\text{SM} = (2\text{FS}/2) - f$$

During normal operation the local $\bar{\bar{f}}$ and remote inverted $\bar{\bar{f}}$ are selected as inputs to the adder 502 and the sum produced. If a carry is produced it is fed around to the carry input and one is added to the sum. This results in the difference between the two $\bar{f}$ counts, which is fed through the TRUE/COMPLEMENT gates 507 to produce a true output if a carry is present and an inverted output is there is no carry. This will produce the true difference if $f_L$ (local) > $f_R$ (remote) or the twos complement of the difference if $\bar{\bar{f}}_L < \bar{\bar{f}}_R$.

The difference between the fills is decoded by the fill decoder such that if it is less than eight (quarter digits) the control outputs (A or R) are inhibited and the link declared "In Limits" (IL), or not out of limits ($\overline{\text{OL}}$). If the difference is between eight and eleven (quarter digits) inclusive the link is still declared IL and the control outputs are enabled. An R is produced when a carry output is produced by the adder 502 after the difference process, an A will be produced for no carry output. When the fill difference is twelve or greater this is detected by gates 510 and the control outputs are enabled as before but the link is declared "Out of Limits" (OL).

The link may also be declared OL by an OL signal from the Fill Decoder Unit (FIG. 9(*f*) if either fill is outside the range 2 to 253 inclusive. Such a signal will also inhibit control signals (A and R) derived as described above and will cause the control command generated by the Fill Decoder Unit to be passed to the Link Output Unit. At the start of the Modifier Update Sequence (MUS) the control outputs (A, R and $\overline{OL}$), as they existed, are held in the stores 519 until the sequence is ended.

In addition to its function of providing the ADVANCE, RETARD, OUT OF LIMITS and NON-OPERATIONAL signals to the common control module and the production of alarm outputs indicating a breakdown of one or other part of the system, the link output unit shown in FIG. 4 also performs the self-conflict check. Self-conflict is a situation in which different signals, for example the remotely derived control signals and the local signals are instructing the oscillator frequency to change in different ways at the same time, and to avoid the difficulties produced by such a situation these control signals are examined to ensure that they are all in accord. Gates 218 and 219 detect the simultaneous presence of signals $A_L$ and $R_R$, and signals $R_L$ and $A_R$ respectively, the outputs of these two gates being combined in the gate 220. The gate 222 detects the simultaneous existence of signals $A_R$ and $R_R$ and the output of this gate is combined with that of the gate 220 in the AND-gate 221, which gate is inhibited by the INHIBIT SC CHECK signal from the fill decoder. Thus any output of the gate 221 indicates the presence of conflicting control signals. Since it is possible that these signals have been produced as a result of noise on the link it is necessary to determine that this is a sustained condition and not merely a chance occurrence. To detect the sustained condition the shift register 223 receives the output of the gate 221 which is clocked along one stage with every occurrence of the signal SIG MOD LATCH UPDATE, except when inhibited by gate 222 if $A_R$ and $R_R$ are both present. If three consecutive conflict signals are produced and recorded in the first three stages of the shift register 223, then the gate 224 produces an output in response to which a LOCAL FAULT signal and a corresponding indication are produced.

As described above with reference to FIG. 5, the receive signal module includes logical elements which is characteristic of the count transmission signals. This structure includes eleven 1's in the right-hand eleven places and three 0's in the 12th, 22nd and 32nd places of the signal. If all of these signal components are present the situation is detected by the gate 308 which produces a corresponding output setting the monostable trigger 319, which, if it is not set, causes the generation of an output signal SYNCH WORD LOSS on the terminal 320. Since the production of an output from the gate 308 indicates the receipt of a count transmission signal from the remote end of the link, this output is also used to set a monostable trigger 307 which produces an output $\overline{\text{SIG MOD LATCH UPDATE}}$ on the terminal 318, which as described above steps the signal output of the gate 221 indicating the presence of a conflict into the shift register 223. The signal $\overline{\text{SIG MOD LATCH UPDATE}}$ also enters into the stores 519, the local control signals $A_L$, $R_L$ and $OL_L$.

Other facilities provided by the receive signal module are the reproduction of a signal inhibiting the modifier updating sequence and indicating a parity fault if either of the parity checkers 310 and 311 produces a signal indicating a failure of the parity checks. In addition the detection of a request for a straight modifier is performed by the gate 315 which produces a signal indicating that a request has been received over the link from the remote station when the 30th digit is a 1. This gate is, however, controlled by the output of the gate 308 detecting the basic signal structure which the signal must have and also the outputs of the gate 306 indicating that the remote $A_R$, $R_R$ and IL signals have the values 1, 1 and 0 respectively and of the parity checkers 310 and 311.

Because the embodiment of the invention described above is constructed from integrated circuit components there are some superfluous stages in certain units. These can be eliminated if other components are employed and the modifications necessary will be evident to those skilled in the art. Moreover, the invention can be adapted to synchronise many other kinds of digital communication system using different frame structures.

It is possible to inhibit either or both of the modifiers in which case a synchronisation scheme with different performance results. For example, if the balanced modifier is omitted it will not be possible without building out link propagation delays to establish absolute phase equality between the clocks in the system although phase differences that do exist will remain constant.

We claim:

1. A digital communication system having at least two stations connected by at least one link, in which each of said stations includes a local clock oscillator for timing operations in the said station, a communication aligner for the link including storage means into which signal digits are entered as they arrive at the said station over the link and from which signal digits are read in response to signals from the local clock oscillator, a fill counter for said link for recording a total dependent on the number of digits stored in the storage means of the communication aligner, means for transmitting an indication of the total in the fill counter over the link to the station at the remote end of the link and for receiving an indication of the total in the fill counter in the station at the remote end of the link, means for forming the difference between the totals in the fill counters at the two ends of the link, and means responsive to the difference between the totals to adjust the frequency of the local clock oscillator in a sense tending to reduce the difference, wherein each said station also includes means for periodically modifying the total in the fill counter of the particular station so that the total lies within a predetermined range of values.

2. A system according to claim 1 wherein the digits transmitted between the stations via a link are divided into frames preceded by frame start signals and at each station the incoming digits have incoming frame start signals and the local clock oscillator produces local frame start signals and timing pulses, the fill counter in the station being arranged to receive the timing pulses for the time intervals separating the incoming and local frame start signals to record the total dependent on the number of digits stored in the communication aligner.

3. A system according to claim 2 wherein in each station there is provided programmable delay means for delaying a frame start signal in dependence upon a modifier, thereby to modify the total recorded in the fill counter.

4. A system according to claim 1, wherein the modifying means in the stations at both ends of a link includes balanced modifying means for modifying the totals in the respective fill counters by the same balanced modifier and in the same sense, so that the modified totals differ from a middle value of the counters by the same amount but in opposite senses.

5. A system according to claim 4 wherein the balanced modifying means is arranged to modify the totals in the fill counters at regular intervals.

6. A system according to claim 4, wherein the digits transmitted between the stations via the link or links are divided into frames, alternate ones of which are preceded by two frame start signals and in each station the incoming data includes incoming two-frame start signals and the local clock produces local two-frame start signals and timing pulses at a rate proportional to the digit rate, there being provided in each station gating means to permit the application of the timing pulses to the fill counter for a plurality of the interval of time separating the incoming and local two-frame start signals, averaging means for producing an indication of the average length of the time intervals, and means for adding that indication to a similar indication derived from the station at the remote end of the link concerned, and for subtracting half the sum from a fixed number to produce a balanced modifier, which is used to modify the total in the fill counters of the particular station and that at the remote end of the link.

7. A system according to claim 1 wherein the modifying means in each station includes straight modifying means for modifying by the application of a straight modifier the total in the fill counter of the particular station to the middle value for the counter.

8. A system according to claim 7 wherein the straight modifying means is effective to modify the total in the fill counter when one of the following conditions occurs:

a. the total in the fill counter in one of the two stations at the ends of a particular link has lain outside a predetermined range of values for a predetermined time interval;

b. the fill difference for the particular link has exceeded a particular value for a predetermined time interval.

9. A system according to claim 1 wherein the modifying means in the stations at both ends of a link includes balanced modifying means for modifying the totals in the respective fill counters by the same balanced modifier and in the same sense, so that the modified totals differ from a middle value of the counters by the same amount but in opposite senses, the modifying means in each station also including straight modifying means for modifying by the application of a straight modifier the total in the fill counter of the particular station to the middle value for the counter, and the balanced modifier and the straight modifier are calculated separately and then added together, and the sum used to modify the number in the fill counter.

10. A system according to claim 9 wherein during calculation of a modifier by the modifying means in a particular station control of the local clock oscillation of that station in dependence upon a fill difference in that station, which difference would be affected by the modifier, is inhibited.

11. A station for a digital communication system including a local clock oscillator and for each link connected to the station:

a communication aligner including storage means into which signal digits are entered as they arrive at the station over the link and from which signal digits are read in response to signals from the local clock oscillator, a fill counter for recording a total depending on the number of digits stored in the storage means of the corresponding communication aligner, means for transmitting an indication of the total in the fill counter over the link, means for deriving from the link an indication of the total in a fill counter located at the remote end of the link, means for forming the difference between the totals in the fill counters at the two ends of the link and means responsive to the difference between the totals to adjust the frequency of the local clock oscillator in a sense tending to reduce the difference, wherein the station also includes means for periodically modifying the total in the fill counter so that it lies within a predetermined range of values.

12. A station according to claim 11 in which the digits are divided into frames which are preceded by a frame start signal, the local clock oscillator producing a local frame start signal and timing pulses and the fill counter being arranged to count the timing pulses for the time interval separating the local frame start signal and an incoming frame start signal, wherein the modifying means includes a programmable delay means responsive to a modifier to delay a frame start signal and thereby alter the time interval.

13. A station according to claim 12 wherein the modifier is one of a balanced modifier and the sum of a balanced modifier and a straight modifier, the modifying means including means for summing a representation of the time interval between a selected alternate local frame start signal and a selected alternate incoming frame start signal and a corresponding representation derived from a remote station, and means for calculating from the sum a balanced modifier such that when applied to the total in the fill counter and to the total in the fill counter at the remote station the modified totals differ from a midrange value for the fill counters by equal and opposite amounts, any straight modifier being such as to make the modified total equal to the mid range value of the fill counter.

* * * * *